(12) United States Patent
Itabashi et al.

(10) Patent No.: US 6,274,993 B1
(45) Date of Patent: Aug. 14, 2001

(54) MOTOR DRIVE CONTROL WITH EXCESS CURRENT PERIOD TIMER RESETTING

(75) Inventors: Toru Itabashi, Anjo; Kazunari Shirai, Chita-gun, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/523,285

(22) Filed: Mar. 10, 2000

(30) Foreign Application Priority Data

Mar. 18, 1999 (JP) .................................................. 11-073659
Nov. 11, 1999 (JP) .................................................. 11-321478

(51) Int. Cl.⁷ .................................. F02D 9/00; H02P 7/29
(52) U.S. Cl. .......................... 318/432; 318/626; 318/599; 123/361; 123/376
(58) Field of Search ...................... 318/599, 626, 318/430, 431, 432, 433; 123/319, 361, 376

(56) References Cited

U.S. PATENT DOCUMENTS

| | | | |
|---|---|---|---|
| 4,328,451 | * | 5/1982 | Barge ..................................... 318/596 |
| 4,614,902 | * | 9/1986 | Jessup .................................... 318/282 |
| 4,675,589 | * | 6/1987 | Sausner et al. ....................... 318/599 |
| 5,712,550 | | 1/1998 | Boll et al. ............................. 318/434 |
| 6,067,960 | * | 5/2000 | Watanabe et al. ............... 318/139 X |

* cited by examiner

Primary Examiner—Bentsu Ro
(74) Attorney, Agent, or Firm—Nixon & Vanderhye P.C.

(57) ABSTRACT

A microcomputer produces to a drive circuit drive command signals for starting to drive and braking a motor so that the position of a throttle valve is controlled to a target position. A current supplied to the motor is limited not to exceed a first current limitation value at the time of motor drive start and braking. When the current limitation continues for a predetermined time period, the current is further limited not to exceed a second current limitation value. The microcomputer detects switching of motor current supply direction. When the current supply direction is switched, a reset command signal is produced to reset a timer operation for a current limitation continuation determination.

7 Claims, 24 Drawing Sheets

MOTOR LOCK (RESTORED)

CALCULATION TIMING

MOTOR DRIVE CONTROL WITH EXCESS CURRENT PERIOD TIMER RESETTING

CROSS REFERENCE TO RELATED APPLICATION

This application relates to and incorporates herein by reference Japanese Patent Applications No. 11-73659 filed on Mar. 18, 1999 and No. 11-321478 filed on Nov. 11, 1999.

BACKGROUND OF THE INVENTION

The present invention relates to a motor drive control. The present invention is suitable for application to an electronic throttle control apparatus for vehicles, specifically for driving a throttle valve disposed in an engine intake pipe by a direct current motor in accordance with a pedal stroke of an accelerator pedal and the like.

U.S. Pat. No. 5,712,550 (Japanese PCT Laid-open Publication JP-A-9-501817) teaches an electronic throttle control apparatus which drives a motor by an H-bridge drive circuit and executes a current limitation while ensuring responsiveness of a valve to be driven. This kind of throttle control apparatus is described with reference to FIGS. 22–26.

As shown in FIG. 22, the electronic throttle control apparatus is for opening and closing a throttle valve 100 by a motor 101. An accelerator sensor 102 detects a pedal stroke of an accelerator 103. A control circuit 104 controls a current supply to the motor 101 through a drive circuit 105 so that the throttle angle is controlled in accordance with the pedal stroke. The drive circuit 105 has four switching devices Q1–Q4 in a H-bridge configuration and connected to the motor 101. A drive logic circuit 106 receives drive command signals A1–A4 from the control circuit (microcomputer and the like) 104 and supplies the current to the motor 101. The current supplied to the motor is monitored by a current detection circuit 107. As shown in FIG. 24, the drive logic circuit 106 has a comparator 108, latches 109 and 110, D flip-flop (DFF) 111, and timers 112, 113 and 114. A high level value Vref(H) and a low level value Vref(L) are provided to be used selectively as a comparison reference for the comparator 108.

As shown in FIG. 25, the motor is supplied with a current of 100% duty ratio to speed up the valve operation during the drive start period (Tst). When the valve is driven to approach a target valve position (Tbr), the motor is supplied with the current in the reverse direction to brake the valve operation. Further, the drive start and braking current is limited to a high current value Ilimit(H). The current limitation is effected by detecting the motor current IM by the current detection circuit 107 and temporarily interrupting the current supply each time the current IM reaches the current limitation value. With this current limitation, the output loss of the drive devices such as power MOSFETs and the like in the Hbridge can be reduced.

On the other hand, a certain limited current is continued to be supplied for a fixed time period even under a lock condition, so that the operation restores from a light lock condition where the valve cannot be controlled to the target position and stays at substantially the same position. This light lock condition may occur from freezing (icing) of water remaining on the valve. Specifically, as shown in FIG. 26, the limit of the current supplied to the motor is switched to a low value Ilimit(L) (<Ilimit(H)), when a motor lock occurs during a period of limiting a motor current IM to the current limitation value Ilimit(H) at the time of motor drive start time (Tst) or braking time (Tbr). The motor lock is detected when the current limitation continues for a predetermined time period (T300).

More specifically, the latch 109 in FIG. 24 stores a history that the current reaches the current limitation value at every predetermined time period To. It is determined that the current limitation is being effected with the current limitation value Ilimit(H) by monitoring the latch 109. The predetermined time period To for this determination is set longer than the switching operation period T1 under the current limitation operation condition.

Thus, the lock condition is determined when the current continues to reach the current limitation value for the predetermined time period, and the current limitation operation is switched to Ilimit(L) thereby to reduce the motor current. As a result, the drive device can be sized smaller for a low cost.

During the current limitation mode by Ilimit(L), the current supply is continued when the motor current IM decreases within the predetermined time period and it is determined that the lock condition has been released. Further, the motor current supply is interrupted when the motor current IM does not decrease during the predetermined time period.

However, as shown in FIG. 26, if the switching time period T2 between the drive start current supply to the braking current supply, it is erroneously determined that the current limitation operation is continuing due to the sum of a limitation period T3 in the drive start current supply period Tst and a limitation period T4 in the braking current supply period Tbr (T3+T4>T300). It is assumed that the history of whether the current has reached the current limitation value within the period longer than the switching period T1 under the current limitation operation is stored to check the lock condition.

The count value which is the sum of the count value T3 in the drive start current supply period Tst and the count value T4 in the braking current supply period Tbr comes to exceed the predetermined value t300, if the current supply condition in which the current does not reach the current limitation value during the predetermined time period in the course from the drive start current supply to the braking current supply is not ensured. As a result, the lock condition is erroneously determined. This erroneous determination causes the current limitation by Ilimit(L) and reduces the output torque at the time of braking current supply. The valve position will undergoes an overshoot as shown in FIG. 26.

According to the conventional apparatus shown in FIG. 25, the current supply is switched to the braking current supply (at timing t200) after the braking current supply at the current value less than the current limitation value is effected for more than the predetermined period To which is for checking the continuation of the current limitation, so that the above erroneous determination may be avoided. That is, the control circuit (microcomputer) 104 produces the drive command signal at the time of switching from the drive start current supply to the braking current supply to ensure the current supply condition of less than the current limitation value for a period (period Tre in FIG. 25) longer than the period To.

Specifically, the control circuit (microcomputer) 104 temporarily produces the command drive signal of 0% duty ratio (current circulation) in the period Tre between the drive start current supply and the braking current supply. The output terminal Q of the D flip-flop 111 in FIG. 24 changes to a L-level and reset the count of the timer 113 once, thereby preventing the erroneous determination.

According to this method, however, the control response characteristics is lowered and the overshoot is caused due to insufficient braking force resulting from the delay of braking current supply after the drive start current supply. Further, the program of the control circuit (microcomputer) 104 which produces the drive command signal becomes complicated.

It is also considered for avoiding other erroneous determination to shorten the drive start current supply time period to slow down the motor operation speed at the time of drive start so that the motor operation speed may be sufficiently reduced even with the braking operation delayed as above. However, the program of the control circuit (microcomputer) 104 becomes very complicated, and the lowering of the original motor operation response characteristics causes lessening of control performance.

SUMMARY OF THE INVENTION

It is therefore an object of the present invention to provide a motor drive control which is capable of preventing an erroneous current supply restriction.

According to the present invention, a current supplied to a motor is detected. The current supply to the motor is interrupted when the current value detected by the current detection means is in an excessive current supply condition and the condition continues for more than a predetermined time period. Further, a time counting operation of the predetermined time period is reset in response to a detection of switching of current supply directions caused between motor drive start and braking.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to various embodiments which are applied to an electronic throttle control system.

(First Embodiment)

Figure 1:
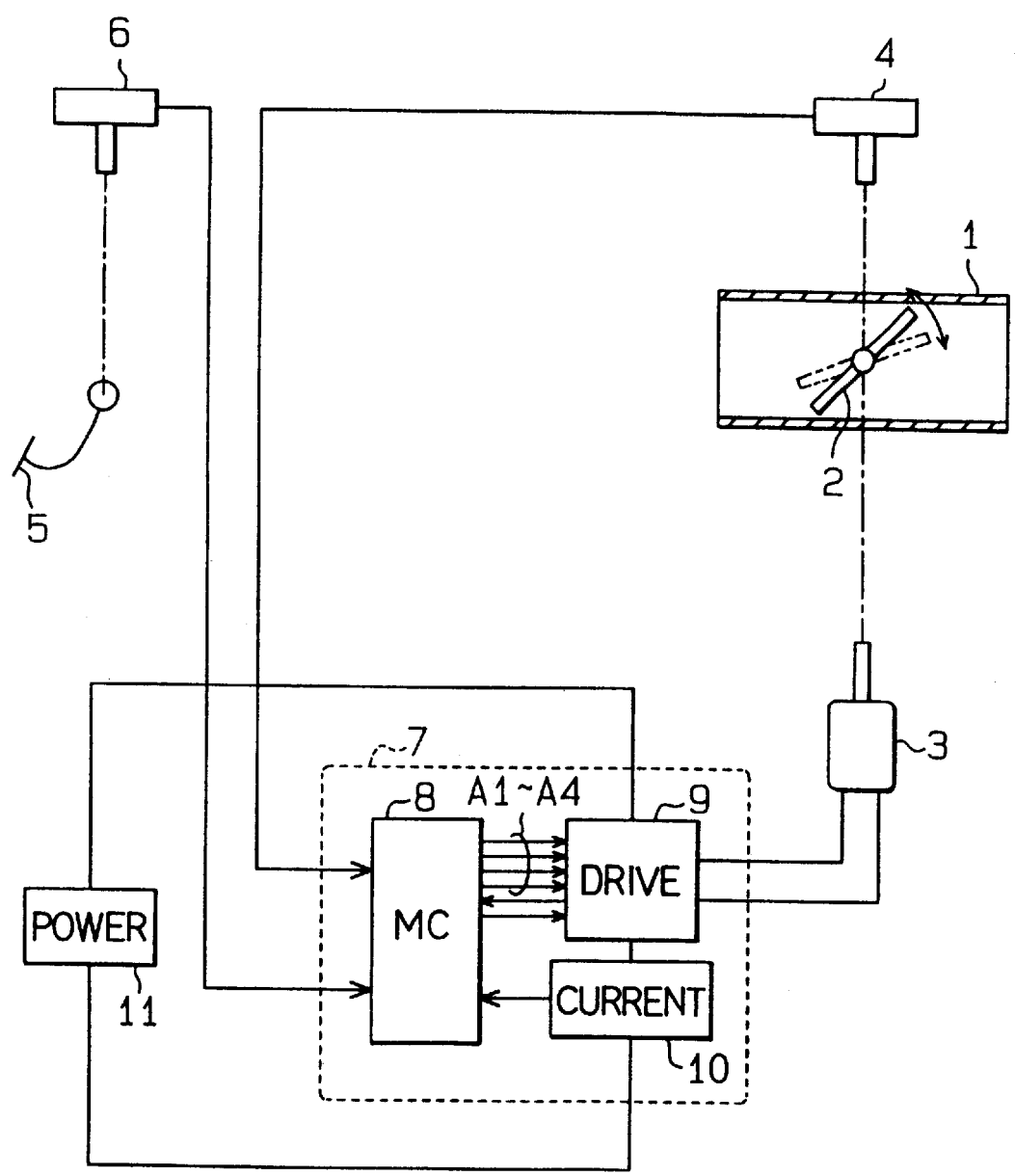
FIG. 1 is a block diagram showing an entire electronic throttle control system according to a first embodiment of the present invention.

As shown in FIG. 1, a throttle valve 2 is provided in an engine intake pipe 1 and supported rotatably in an opening and closing directions. The throttle valve 2 is biased in the valve direction by a return spring (not shown). The throttle valve 2 is coupled to an output shaft of a direct current motor 3 so that the throttle valve 2 is driven by the direct current motor 3 against the biasing force of the return spring. More specifically, the throttle valve 2 is forced by the return spring to return to a substantially closed position which enables an engine idling operation. The direct current motor 3 applies a torque to drive the throttle valve 2 the valve opening direction against the biasing force of the return spring. The current supplied to the direct current motor 3 is increased to produce a required torque at the time of a motor in driving the direct current motor 3.

The opening angle of the throttle valve 2 is detected by a throttle angle sensor 4. The pedal stroke of an accelerator pedal 5 controlled by a vehicle driver is detected by an accelerator sensor 6.

The system has an electronic control unit 7 which controls the opening angle of the throttle valve 2 as well as an ignition timing and a fuel injection quantity. The electronic control unit 7 has a microcomputer 8, a motor drive circuit 9 and a current detection circuit 10. The microcomputer 8 receives an angle detection signal of the throttle valve 2 from the throttle angle sensor 4 and a pedal stroke detection signal of the accelerator pedal 5 from the accelerator sensor 6. The microcomputer 8 receives a temperature detection signal of an engine coolant in addition to the above sensor signals.

The microcomputer 8 produces drive command signals A1–A4 to the motor drive circuit 9 in response to the received accelerator pedal stroke. The motor drive circuit 9 is in the H-bridge type to drive the direct current motor 3 and connected to a power source (vehicle-mounted battery) 11. The motor drive circuit 9 receives four drive command signals A1–A4 from the microcomputer 8 and supplies current to the motor 3 to drive the throttle valve 2 to a target throttle angle set in accordance with the accelerator pedal stroke. The current detection circuit 10 detects the current supplied to the direct current motor 3.

The drive circuit 9 limits the current supplied to the direct current motor 3 not to exceed a current limitation value Ilimit(H) in predetermined time periods corresponding to the motor drive start and braking. It limits the current not to exceed a lower current value Ilimit(L) when the above current limitation continues for a predetermined time period. Therefore, the current supplied to the direct current motor 3 is limited to the current limitation value Ilimit(L) when a motor lock is occurring. This current limitation is released when the motor lock disappears during the current limitation operation with the current limitation value Ilimit(L). However, the microcomputer 8 changes all the drive command signals A1–A4 to the L-level to interrupt the current supply to the direct current motor 3, when the opening angle of the throttle valve 2 does not approach the target throttle angle after the predetermined time period.

As described above, the current supplied to the motor 3 is limited not to exceed the current limitation value Ilimit(L) when the lock occurs in which the throttle valve 2 cannot be controlled to the target position and stops at substantially the same position.

Figure 2:
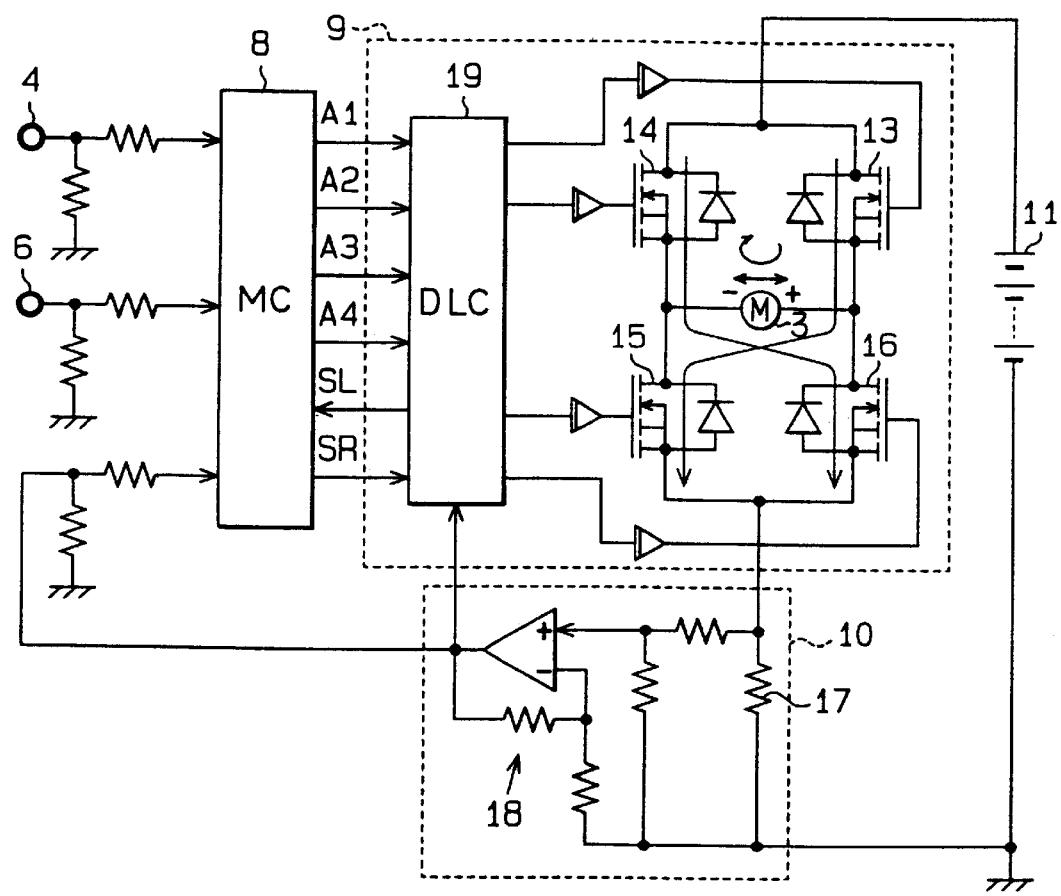
FIG. 2 is an electric circuit diagram showing a drive circuit used in the first embodiment.

Detailed construction of the motor drive circuit 9 is shown in FIG. 2. The motor drive circuit 9 is constructed with four switching devices, MOSFETs 13, 14, 15 and 16, connected in the H-bridge configuration. The positive terminal and the negative terminals of the motor 3 are connected to an intermediate junction between the MOSFETs 13 and 16 at the right side and an intermediate junction between the MOSFETs 14 and 15, respectively. The high side of the motor drive circuit 9 is connected to the positive terminal side of the power source (battery) 11.

The current detection circuit 10 is connected to the low side of the motor drive circuit 9. The current detection circuit 10 is constructed with a current detection resistor 17 connected between the low side of the motor drive circuit 9 and the ground side and a differential amplifier circuit 18 which amplifies a difference of potentials at both ends of the current detection resistor 17.

The motor drive circuit 9 has a drive logic circuit 19. The drive command signals A1–A4 of the microcomputer 8 and the motor current detection signal of the current detection circuit 10 are applied to the drive logic circuit 19. Further, the motor current detection signal of the current detection circuit 10 is applied to the microcomputer 8.

Figure 3:
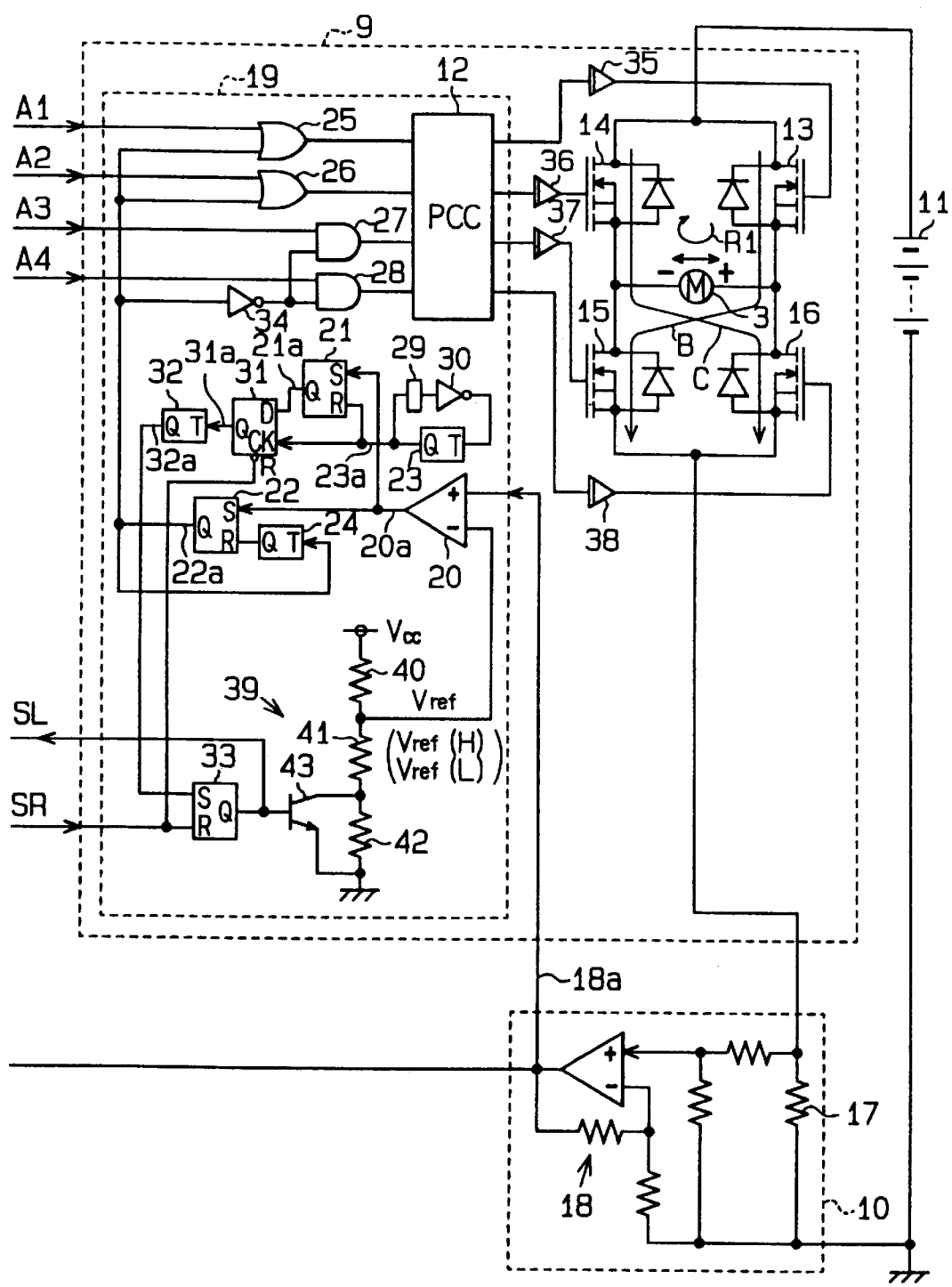
FIG. 3 is a detailed electric circuit diagram showing the drive circuit shown in FIG. 2.
Figure 4:
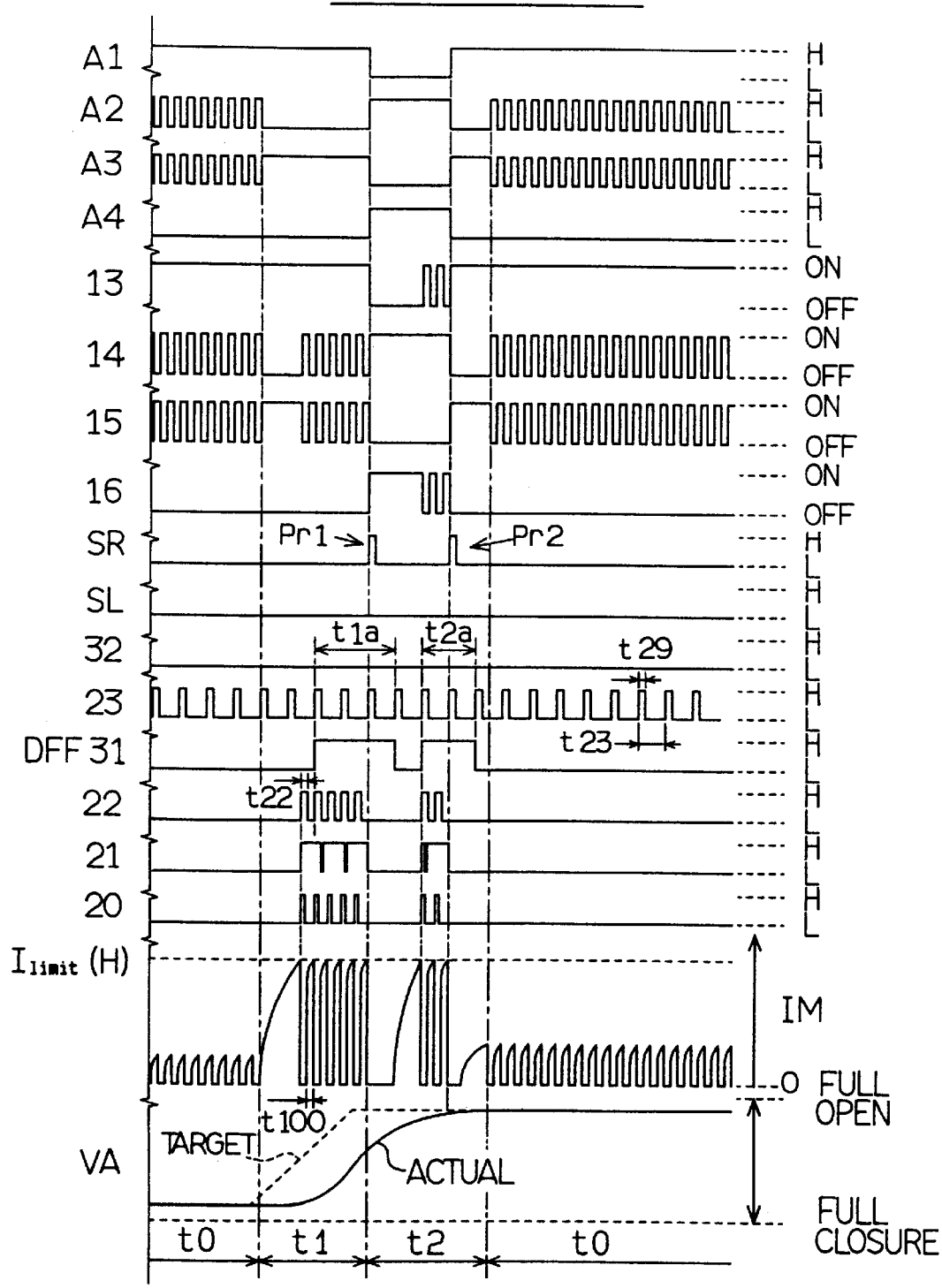
FIG. 4 is a timing diagram showing an operation of the first embodiment under a normal operation.
Figure 5:
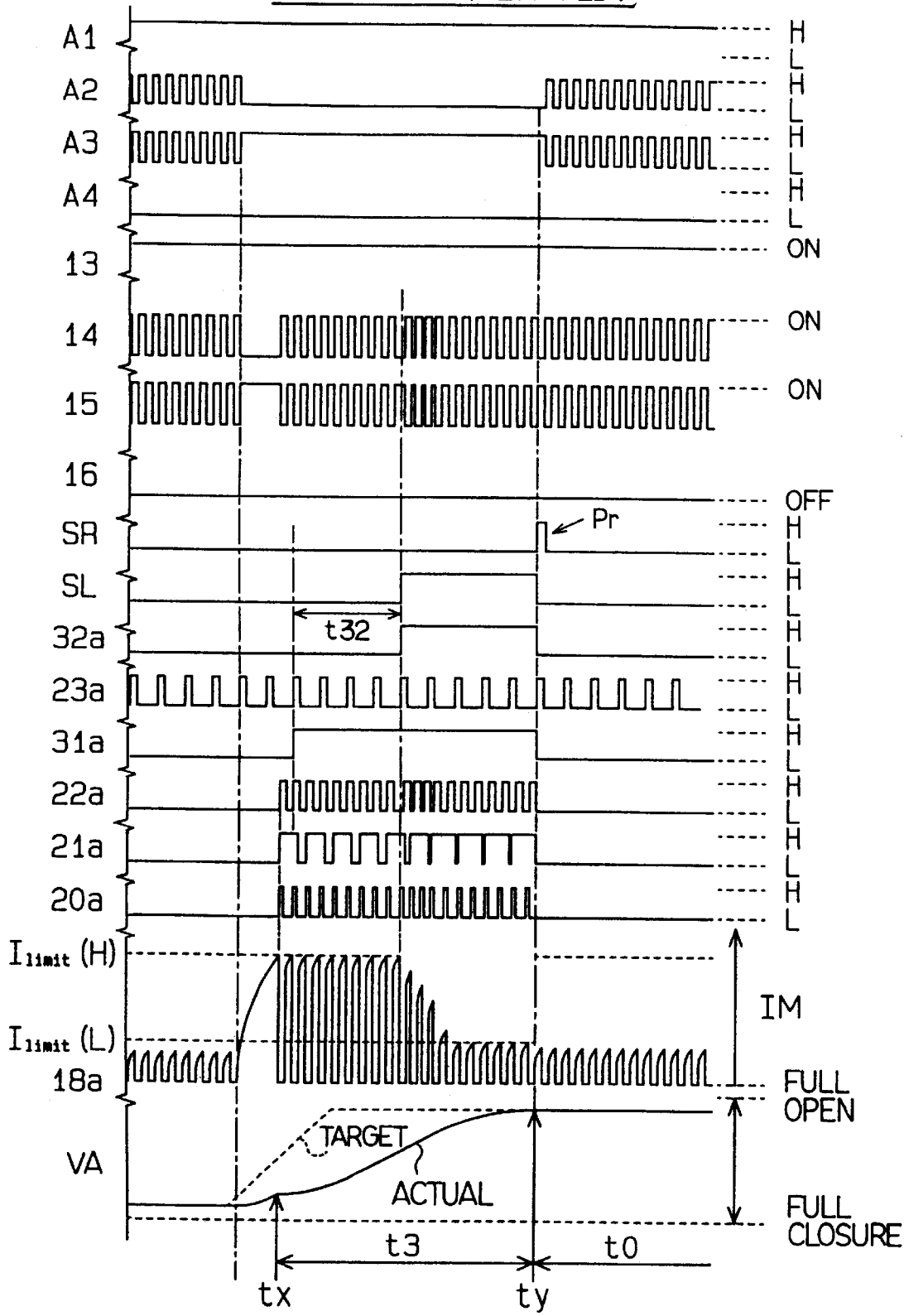
FIG. 5 is a timing diagram showing an operation of the first embodiment under a motor lock condition.

The detailed construction of the drive logic circuit 19 is shown in FIG. 3. In connection with this description, reference is made to a timing diagram of FIG. 4 showing a normal operation and a timing diagram of FIG. 5 showing a motor lock (restored).

The output of the current detection circuit 10 (voltage corresponding to the current to the direct current motor 3) shown in FIG. 3 is applied to the positive terminal of a comparator 20 to be compared with a reference voltage Vref applied to the negative terminal. The reference voltage Vref is set to correspond to the current limitation value at the time of the current limitation operation. This current limitation value is set to a value which will not damage the MOSFETs 13–16 even when the current supply is continued for a certain time period. The output of the comparator 20 changes to the H-level each time the current of the direct current motor 3 exceeds the current limitation value. This H-level signal is applied to the set terminals S of RS latches 21 and 22 which are a set-priority type. The outputs of timers 23 and 24 are applied to the reset terminals R of the RS latches 21 and 22, respectively.

The RS latch 22 is set to produce the H-level signal from its output terminal Q to gates 25, 26, 27, 28, and the timer 24, when it receives from the comparator 20 at its set terminal S the H-level signal indicating that the current of the direct current motor 3 is in excess of the current limitation value. The timer 24 is for setting a time period during which the current supply to the direct current motor 3 is temporarily tuned off (interrupted) each time the current of the direct current motor 3 exceeds the current limitation value in the current limitation operation.

The timer 24 starts a time counting operation by its internal counter in response to the H-level signal applied thereto. It produces the H-level signal from its output terminal Q to the reset terminal R of the RS latch 22, when counting of a predetermined time period is completed. Thus, the RS latch 22 produces the L-level signal from its output terminal Q to the gates 25–28 and the timer 24 after being reset. The timer 24 resets its internal counter and changes its output at its output terminal Q to the L-level in response to the L-level signal applied thereto.

As described above, a closed loop is provided by the RS latch 22 and the timer 24. The output terminal Q of the RS latch 22 produces, as shown in FIG. 4, the H-level signal for the time period t22 to turn off the current supply to the direct current motor 3 each time the current supplied to the direct current motor 3 exceeds the current limitation value in the current limitation operation.

As shown in FIG. 3, the RS latch 21 receives at its reset terminal R the output of the output terminal Q of the timer 23. The timer 23 receives the output of its output terminal Q at its input terminal T through a delay circuit 29 and an inverter 30. Thus, the timer 23 inverts its output of its output terminal Q to the L-level. A delay circuit 29 inverts its output to the L-level after a fixed time period, and at the same time the inverter 30 applies the H-level signal to the input terminal T of the timer 23.

The timer 23 starts its time counting operation by the internal counter, and produces the H-level signal from its output terminal Q when counting the predetermined time period is completed. This H-level signal is applied to the inverter 30 after the fixed time delay. The inverter 30 applies the L-level signal to the input terminal T of the timer 23. Thus, the timer 23 resets its internal counter and inverts its output at the output terminal Q to the L-level.

As described above, a closed loop is provided by the timer 23, the delay circuit 29 and the inverter 30. As shown in FIG. 4, the timer 23 produces at its output terminal Q the H-level signal for the delay time period t29 of the delay circuit 29 every fixed time period t23 set by the timer 23.

The output at the output terminal Q of the timer 23 shown in FIG. 3 is applied to the reset terminal R of the RS latch 21 and the clock input terminal CK of a D flip-flop (DFF) 31. The output terminal Q of the RS latch 21 is connected to the data input terminal D of the D flip-flop 31.

The RS latch 21 is set to produce the H-level signal from its output terminal Q to the data input terminal D of the D flip-flop 31, when it receives at its set terminal S the H-level signal from the comparator 20 indicating that the current supplied to the direct current motor 3 is in excess of the current limit value. The RS latch 21 is reset by the H-level signal applied to its reset terminal R from the timer 23 every fixed time period t23. It produces the L-level signal from its output terminal Q to the data input terminal D of the D flip-flop 31.

On the other hand, the D flip-flop 31 stores and holds the output level, which is produced at the output terminal Q of the RS latch 21 and applied to its data input terminal D, at the timing when the output level of the timer 23 applied to its clock input terminal CK changes from the L-level to the H-level. It produces to the input terminal T of the timer 32 a level corresponding to the stored level.

As the RS latch 21 and the D flip-flop 31 operate as described above, the D flip-flop 31 produces the H-level signal from its output terminal Q to the input terminal T as shown in FIG. 4, when the current supplied to the direct current motor 3 exceeds the current limitation value within the time period t23 set by the timer 23.

Here, the time period t23 set by the timer 23 is set to be longer than a time period which is a sum of the time period t22 and a time period t100 (FIG. 4). The time period t22 indicates a time period for temporarily turning off (interrupting) the current supply to the direct current motor 3 when the current of the direct current motor 3 exceeds the current limitation value in the current limitation operation. The time period t100 indicates a time period in which the current of the direct current motor 3 exceeds the current limitation value again after restarting the current supply from the temporary turning off of the current supply. Thus, the output of the output terminal Q of the D flip-flop 31 is maintained at the H-level in the current limitation operation.

The timer 32 shown in FIG. 3 starts a time period counting by its internal counter, when the D flip-flop 31 produces from its output terminal Q the H-level signal indicating that the current supplied to the direct current motor 3 continues to exceed the current limitation value. It counts time periods t1a and t2a (FIG. 4) in which the current continues the current limitation value. The timer 32 produces from its output terminal Q to a latch 33 the H-level signal (start signal for the current limitation operation by Ilimit(L)), when it completes counting of the predetermined time period t32 as shown in FIG. 5.

The timer 32 resets its internal counter and produces the L-level signal from its output terminal Q to the latch 33, when it receives from the output terminal Q of the D flip-flop 31 the L-level signal indicating that the current supplied to the direct current motor 3 does not exceed the current limitation value.

Here, the time period t32 (FIG. 5) set by the timer 32 is for determining the timing to start the current limitation operation by the Ilimit(L) when the period of the current supply for starting the motor drive or braking the motor 3 lasts long. It is set to be a little longer than the time period of the current supply for starting the motor drive or motor braking in the normal operation.

Thus, as shown in FIG. 4, the actual throttle opening angle approaches the target throttle angle and the current supply for starting the motor drive or motor braking ends before the time periods t1a and t2a counted by the internal counter of the timer 32 reach the time period t32 in the current supply for starting and braking under the normal operation. As a result, the start of motor drive and the braking are executed while being subjected to the current limitation operation of the high current limitation value Ilimit(H), so that the drive responsiveness is improved at the time of starting the motor drive and the braking.

As described above, current limitation operation continuation determination circuit is constructed by the timer 23, latch 21, D flip-flop (register) 31 and timer 32 for determining that the current limitation condition is continuing with the predetermined limitation current for the predetermined time period.

The output (output to RS latch 22) to the gates 25–28 shown in FIG. 3 is inverted to the H-level for the time period t22 in which the current supply to the direct current motor 3 is temporarily turned off each time the current supplied to the direct current motor 3 exceeds the current limitation value, because the current limitation is effected with the high current limitation value Ilimit(H) during the normal operation (FIG. 4).

The output of the RS latch 22 is applied to the OR gates 25 and 26, and also applied to the AND gates 27 and 28 through an inverter 34. The drive command signals A1–A4 produced from the microcomputer 8 are applied to the OR gates 25, 26 and the AND gates 27, 28, respectively. The outputs of the OR gates 25 and 26 are applied to the MOSFETs 13 and 14 at the high side through a protective control circuit 12 and pre-drivers 35 and 36. Thus, the MOSFETs 13 and 14 at the high side turns on when the drive command signals A1 and A2 for the high side are at the H-level.

Further, the MOSFETs 13 and 14 at the high side turn on even during the time period of temporarily turning off the current supply in the current limitation operation, so that the energy remaining in the coil of the direct current motor 3 in the turn-off period of the current supply during the current limitation operation is circulated through a circulation path R1.

The outputs of the AND gates 27 and 28 are applied to the gates of the MOSFETs 15 and 16 at the low side through the protective control circuit 12 and pre-drivers 37, 38. Thus, the MOSFETs 15 and 16 at the low side turn on when the drive command signals A3 and A4 are at the H-level and the output of the inverter 34 is at the H-level.

During the current limitation operation (FIGS. 4 and 5), the output of the RS latch 22 (indicated by 22a in FIG. 5) is inverted to the H-level for the time period of temporarily turning off the current supply to the direct current motor 3 each time the current supplied to the direct current motor 3 exceeds the current limitation value. Thus, the output of the inverter 34 is inverted to the L-level for the time period of turning off the current supply to the direct current motor 3 each time the current of the motor 3 exceeds the current limitation value. Therefore, the output of the AND gate 27 (or 28) changes to the L-level temporarily each time the current of the direct current motor 3 exceeds the current limitation value. Thus, the MOSFETs 15 (or 16) at the low side is temporarily turned off to reduce the current of the direct current motor 3 to less than the current limitation value each time the current of the direct current motor 3 exceeds the current limitation value during the current limitation operation.

As shown in FIG. 3, a reference voltage switching circuit 39 is connected to the negative input terminal of the comparator 20. The circuit 39 is for switching the reference voltage Vref applied to the negative input terminal of the comparator 20 between a voltage Vref(H) corresponding to the high current limitation value Ilimit(H) and a voltage Vref(L) corresponding to the low current limitation value Ilimit(L). In the reference voltage switching circuit 39, three resistors 40, 41 and 42 are connected in series between the power source voltage Vcc and the ground. The collector and emitter of a transistor 43 are connected to both ends of the resistor which is at the ground side, and the intermediate junction between the resistors 40 and 41 is connected to the negative input terminal of the comparator 20.

The output terminal Q of a latch 33 is connected to the base of the transistor 43 which is for switching the reference voltage, so that the reference voltage Vref (current limitation value) is switched in response to the output of the latch 33. This latch 33 receives at its input terminal S from the timer the signal which indicates that the limitation operation with the predetermined current limitation value Ilimit(H) continued for the predetermined time period. It is set when this signal changes to the H-level, and stores and holds it to produce the H-level signal at the output terminal Q.

The transistor 43 turns on in response to the H-level signal to execute the current limitation operation by Ilimit(L). Thus, the current limitation continuation determination signal is stored and held in the latch 33. This signal is applied from the timer 32 which checks the continuation of the current limitation by Ilimit(H) to the transistor 43 which reduces the current limitation value. In this embodiment, the latch 33 is used as storing and holding means for the current limitation continuation determination signal.

The output terminal Q of the latch 33 is also connected to the microcomputer 8 to apply a monitor signal SL indicative of the condition of current limitation by Ilimit(L) to the microcomputer 8. That is, the current limitation condition monitor signal SL indicates that the current limitation operation by the predetermined current Ilimit(H) continued for the predetermined period longer than the period of current supply for starting the motor drive or for braking and the current limitation operation is being executed with the low current limitation current Ilimit(L) switched from the high limitation current value (that is, current limitation condition after the determination of lock).

The reset terminal R of the latch 33 is connected to the microcomputer 8 to receive from the microcomputer 8 a reset command signal SR. The latch 22 is reset in response to this signal SR (H-level signal) to produce the L-level signal from its output terminal Q.

The reset command signal SR is applied to the reset terminal R of the D flip-flop 31. The D flip-flop 31 and the latch 33 are reset by this signal SR. The D flip-flop 31 produces the L-level signal to the output terminal Q thereby to reset the timer 32 and clear the current limitation continuation determination condition. Thus, the signal SR produced from the microcomputer 8 is used as a signal which resets the current limitation condition.

The protective control circuit 12 includes a logic such as an excessive current protective control logic and the like thereby to prevent an excessive current, that is, feedthrough current, which is caused when the MOSFETs 13–16 at the high side and the low side connected to both terminals of the direct current motor 3 at the same time, or to forcibly turn off the MOSFETs 13–16 when the excessive current flows.

As described above, the present system has the motor 3 having the output shaft to which the throttle valve 2 (driven object) is coupled to be position-controlled, the drive circuit 9 which supplies the current to the motor 3, the throttle angle sensor 4 as position detection means which detects the position of the throttle valve 2, and the current detection circuit 10 as current detection means which detects the current supplied to the motor.

Figure 6:
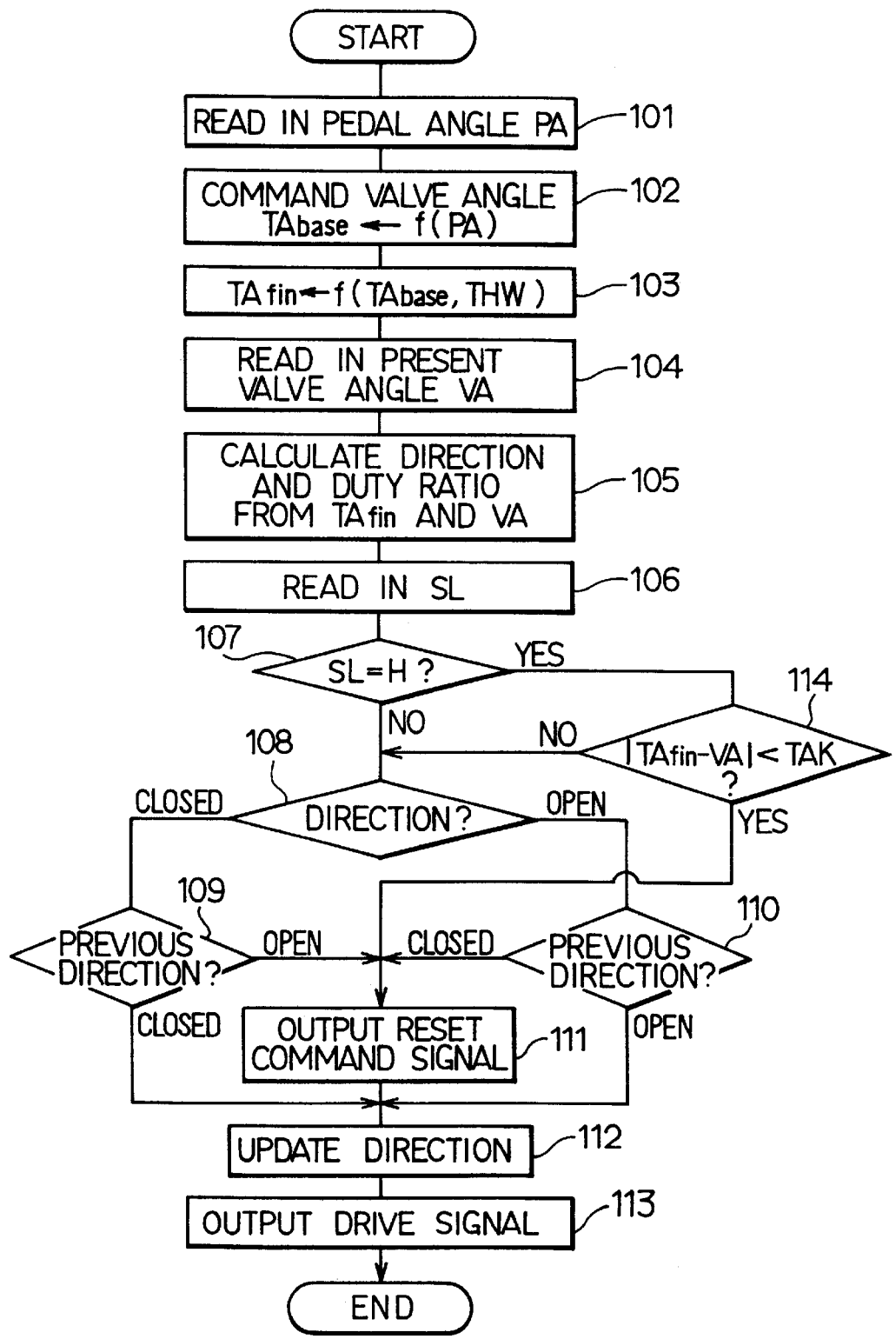
FIG. 6 is a flow diagram showing a processing of a microcomputer used in the first embodiment.

The operation of the motor drive apparatus as constructed above is described next. FIG. 6 is a flow diagram showing processing which the microcomputer 8 executes.

Figure 7:
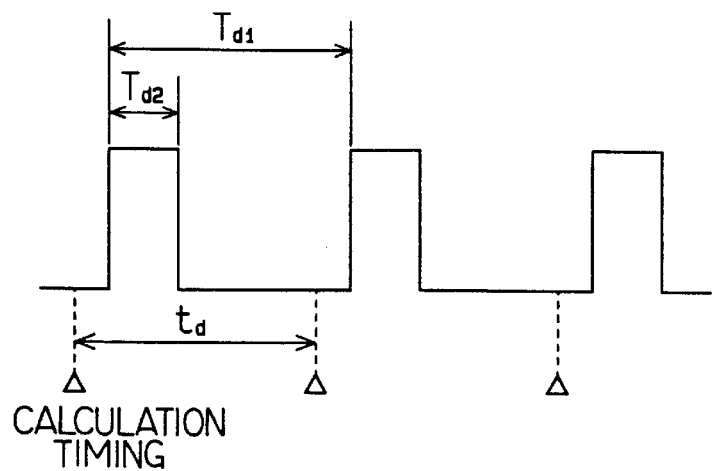
FIG. 7 is a timing diagram showing a calculation processing timing of the microcomputer shown in FIG. 6.

The microcomputer 8 repeats this processing at a sufficiently short time interval td which is sufficiently short not to influence the valve operation due to operation delay. That is, as shown in FIG. 7, the processing is executed at the sufficiently short time interval td when the duty signal (duty ratio=Td2/Td1). This time interval td is also a time interval for producing a duty output which is short enough to stabilize the valve behavior.

FIG. 6 is for describing in detail with respect to producing the reset command signal at step 111. The microcomputer 8 also executes various processing (drive starting current supply processing and braking current supply processing) other than the processing shown in FIG. 6.

The microcomputer 8 first reads in the angle PA of the accelerator pedal 5 from the signal of the accelerator sensor 6 at step 101, and calculates a basic target valve angle TAbase in correspondence with the accelerator pedal angle PA at step 102. Further, the microcomputer 8 corrects the basic target valve angle TAbase with an engine coolant temperature THW and the like at step 103 to calculate a final target valve angle TAfin. Further, the microcomputer 8 reads in the present angle VA of the throttle valve 2 from the signal of the throttle angle sensor 4 at step 104, and calculates the direction of motor rotation and the duty ratio from the final target valve angle TAfin and the throttle angle VA at step 105.

The microcomputer 8 further reads in the current limitation condition monitor signal SL at step 106. It then checks at step 107 whether the current limitation monitor signal SL is at the H-level or not, that is, whether the current limitation is executed under the lock condition. If the current limitation condition monitor signal SL is at the H-level (current is limited), the microcomputer 8 compares a difference between the final target valve angle TAfin and the present valve angle VA with a target angle approaching reference value TAK at step 114. If the difference is small, the microcomputer 8 produces the reset command signal SR at step 111.

If the current limitation condition monitor signal SL is at the L-level (current is not limited) or it is determined at step 114 that the difference between the final target valve angle TAfin and the present throttle angle is more than the target angle approaching reference value TAK, the microcomputer 8 checks at step 108 whether the rotation direction of the motor determined presently is the valve closing direction or the valve opening direction. If the rotation direction of motor is the valve closing direction in the present determination, the microcomputer 8 checks at step 109 whether the rotation direction of the motor determined in the previous determination is the valve closing direction or the valve opening direction. If the present motor rotation direction is the valve closing direction and the previous motor rotation direction is the valve closing direction, the microcomputer 8 produces the reset command signal (H-level pulse) SR at step 111. This reset command signal SR is indicated by a H-level pulse Pr1 in FIG. 4.

If the present rotation direction of the motor is determined to be the valve opening direction at step 108, the microcomputer 8 checks at step 110 whether the rotation direction of motor determined previously is the valve closing direction or the valve opening direction. If the present motor rotation direction is the valve opening direction and the previous motor rotation direction is the valve closing direction, the microcomputer 8 produces the reset command signal (H-level pulse) SR at step 111. This reset command signal SR is indicated by a H-level pulse Pr2.

On the other hand, if the present motor rotation direction and the previous motor rotation direction are determined to be the valve closing direction and the valve closing direction at steps 108 and 109, respectively, the microcomputer 8 does not execute step 111 but executes step 112. Similarly, if the present motor rotation direction and the previous motor rotation direction are determined to be the valve opening direction and the valve opening direction at steps 108 and 110, respectively, the microcomputer 8 does not execute step 111 but executes step 112.

According to the above processing at steps 108–111, switching of the motor current supply direction is detected and the current supply direction is changed. Further, according to the processing at steps 114–111, the reset command signal SR (H-level pulse) is produced when the throttle angle approaches the target angle. This SR signal resets the latch 33 in FIG. 33 which holds and outputs the current limitation condition monitor signal. The flip-flop 31 is reset at the same time to produce the L-level from its output. Thus, the count of the timer 32 for checking the current limitation continuation is temporarily reset, thus releasing checking of the current limitation continuation. Following this operation, the latch 33 produces the L-level from its output terminal Q and turns off the transistor 43 for switching the current limitation reference value. The limitation current reference value restores to the H-level Ilimit (H). Operation following turning off of the transistor 43 is described later in detail.

The microcomputer 8 updates the motor rotation direction at step 112, that is, stores (overwrites) the motor rotation direction (valve closing direction or valve opening direction) determined in the present determination in a memory, after executing step 109, 110 or 111. This updated data is used as the previous data in the next processing.

The microcomputer 8 further produces the drive signals (drive command signals A1–A4) at step 113.

Next, the timing diagrams shown in FIGS. 4 and 5 are described below. The normal operation is described first with reference to FIG. 4.

The timing diagram shown in FIG. 4 shows from the top the levels of the drive command signals A1–A4, on/off conditions of the MOSFETs 13–16, reset command signal SR, current limitation condition monitor signal SL, output level of the timer 32, output level of the timer 23, output level of the D flip-flop 31, output level of the RS latch 22, output level of the RS latch 21, output level of the comparator 20, detection current of the motor (motor current), and the throttle angle (detection value of the throttle angle sensor).

Normally, the transistor 43 for switching the reference voltage is held at off condition, because the output of the timer 32 in FIG. 3 is maintained at the L-level. Under this condition, the reference voltage Vref applied to the comparator 20 from the reference voltage switching circuit 39 shown in FIG. 3 is maintained at the voltage Vref(H) corresponding to the high current limitation value Ilimit(H). Vref(H) is expressed as follows, assuming that resistances of three resistors 40–42 of the reference voltage switching circuit 39 are R40–R42.

$$Vref(H)=Vcc\times(R41+R42)/(R40+R41+R42)$$

This high reference voltage Vref(H) is set to a high current value so that the current limitation value does not damage the drive start performance (or braking performance).

During the period to in which the throttle valve 2 remains at rest and the throttle angle does not change, the microcomputer maintains its drive command signal A1 at the H-level to maintain the throttle valve 2 at the same angle against the return spring. The microcomputer 8 switches the drive command signal A3 between the H-level and the L-level at the predetermined duty ratio to turn on and off the MOSFET 15 at the low side and left side while maintaining the MOSFET 13 at the high side and the right side turned on. Thus, the throttle valve 2 is maintained at the same angle by supplying the direct current motor 3 with the current of the predetermined duty ratio in the arrow direction (forward direction) B in FIG. 3.

Specifically, the hold current supply period t0 is a period in which a change in the target valve angle required by the pedal position detection signal or the like is within a predetermined value or a change rate per unit time is within a predetermined value. A feedback control is effected to match the actual throttle angle with the target throttle angle thereby maintaining the angle of the throttle valve 2 at the target valve angle.

During this hold current supply period t0, each time the drive command signal A3 is at the L-level, the drive command signal A2 is switched to the H-level during that L-level period. Thus, each time the MOSFET 15 at the low side and the left side turns off, the MOSFET 14 at the high side and the left side is turned on so that the energy remaining in the coil of the direct current motor 3 is circulated in the feedthrough path R1.

That is, the drive command signal A2 is simultaneously produced in opposite on/off relation with the drive command signal A3 to absorb the energy which remains in the coil of the motor when the current supply is turned off. As the drive circuit 9 turns on the MOSFET 14 in response to the drive command signal A2 at the time of turning off of the MOSFET 15 thereby to flow the energy remaining in the motor through the feedthrough path R1 to absorb it.

When the accelerator pedal 5 is depressed and the target throttle angle is changed thereafter, the microcomputer 8 starts to drive the direct current motor 3 with 100% duty ratio so that drive start is effected to control the actual throttle angle closely to the target throttle angle. During this drive start current supply period t1, the drive command signals A1 and A3 are maintained at the H-level to maintain the MOSFET 13 at the high side and the right side and the MOSFET 15 at the low side and the left side turned on. The direct current motor 3 is supplied with the current of 100% duty ratio in the arrow direction B (forward direction) in FIG. 3 so that the drive start torque is increased to move the throttle valve 2 at high speeds.

Here, at the time of starting the drive start current supply, the direct current motor 3 is supplied with the current of 100% duty ratio. Each time the current of the direct current motor 3 exceeds the high current limitation value Ilimit(H) set represented by the high reference voltage Vref(H) during the drive start current supply period t1, the output of the RS latch 22 changes to the H-level only during the time period t22 set by the timer 24. This H-level signal is inverted to the L-level signal by the inverter 34 and applied to the AND gate 27.

For this reason, even when the drive command signal A3 for the low side is at the H-level, the output of the AND gate 27 changes to the L-level temporarily each time the current of the direct current motor 3 exceeds the current limitation value Ilimit(H). Thus, the MOSFET 15 at the low side is turned off each time the current of the direct current motor 3 exceeds the high current limitation value Ilimit(H). The current of the direct current motor 3 is thus limited to less than the high current limitation value Ilimit(H).

In the application to automotive vehicles and the like to which a high safety is required, the biasing force of the return spring applied to the throttle valve 2 is set large enough to return the throttle valve 2 to the safe position without fail upon occurrence of failure. Because a large motor current which corresponds to the torque sufficient to exceed the return force and drive the throttle valve 2 with high responsiveness is required, the current limitation value Ilimit(H) should be set to a comparatively H-level.

During this current limitation operation, the output of the OR gate 26 is changed to the H-level in the off period of the MOSFET 15 at the low side (H-level period of RS latch 22). The MOSFET 14 at the high side and the left side is turned on so that the energy remaining in the coil of the direct current motor 3 is circulated through the feedthrough path R1.

When the microcomputer 8 detects that the throttle valve 2 is entering into a predetermined zone provided for the target throttle angle due to the drive start current supply, the drive start current supply period t1 ends and the braking current supply is effected. The direct current motor 3 is supplied with the current of 100% duty ratio in reverse at the start of braking. That is, when the microcomputer 8 detects that the actual throttle angle is entering into the predetermined zone provided for the target throttle angle in the drive start current supply period t1, the drive start current supply period t1 is terminated and the braking current supply is effected to brake the throttle valve 2 in motion and stop it at the target throttle angle.

During this braking period t2, the MOSFET 14 at the high side and the left side and the MOSFET 16 at the low side and the right side are both maintained turned on. The direct current motor 3 is supplied with the current of 100% duty ratio in the arrow direction C (reverse direction) in FIG. 3. Thus, the braking force is increased to stop the throttle valve 2 at the target throttle angle.

Each time the current of the direct current motor 3 exceeds the high current limitation value Ilimit(H) represented by the high reference voltage Vref(H) during this braking current supply period t2, the output of the RS latch 22 is changed to the H-level only for the period t22 set by the timer 24. In the same manner as in the above drive start current supply, the current supply is temporarily turned off each time the current of the direct current motor 3 exceeds the current limitation value Ilimit(H). As a result, the current of the motor 3 is limited to less than the high current limitation value Ilimit(H).

On the other hand, if the drive start current supply and the braking current supply occurs in succession, switching of the motor current supply is detected in the processing of FIG. 6. When the direction changes from direction B for the drive start current supply to direction C for the braking current supply, the reset pulse Pr1 is produced and the timer 32 is reset. That is, the timer operation at the time of current limitation by the current limitation value Ilimit(H) is reset. Similarly, the reset pulse Pr2 is produced and the timer 32 is reset, when the current supply direction is switched at the time of hold current supply after the braking current supply.

Further, the hold current supply control is effected in the same manner as before the drive start of the direct current motor 3 (period t0), after the throttle valve 2 remains at the target throttle angle.

The operation in the case of motor lock (restored) is described next with reference to FIG. 5.

FIG. 5 shows a case in which the motor lock occurs at the timing tx immediately after starting the drive start current supply with 100% duty ratio.

It may occur that the drive start current supply continues, when the throttle valve 2 does not approach the target throttle angle even if the drive start limited with the high current limitation value Ilimit(H) is effected. Thus, the current limitation value is lowered in the following manner, when the drive start count period t1a counted by the internal counter of the timer 32 in FIG. 3 (period of the motor current in excess of the current limitation value Ilimit(H)) reaches the period t32.

When the drive start count period t1a counted by the internal counter of the timer 32 reaches the period t32, the H-level signal is applied from the timer 32 to the base of the reference voltage switching transistor 43 through the latch 33. Thus, the transistor 43 is turned on and both ends of the resistor 42 in the reference voltage switching circuit 39 is shorted. The reference voltage Vref applied from the reference voltage switching circuit 39 to the comparator 20 is switched to the voltage Vref(L) which corresponds to the low current limitation value Ilimit(L). This low reference voltage Vref(L) is expressed as follows.

$$Vref(L) = Vcc \times R41/(R40+R41)$$

This low current limitation value Ilimit(L) set by the low reference voltage Vref(L) is set to a low current value which will not damage the MOSFETs 13–16 even if it is continued to be supplied for a certain period under the motor lock condition.

Thus, when the reference voltage Vref applied to the comparator 20 is switched to the voltage Vref(L) which corresponds to the low current limitation value Ilimit(L), the output of the RS latch 22 is changed to the H-level only for the time period set by the timer 24 each time the current of the direct current motor 3 exceeds the low current limitation value Ilimit(L). This H-level signal is inverted to the L-level signal by the inverter 34 and applied to the AND gate 27. Thus, the MOSFET 15 at the low side is turned off temporarily each time the current of the direct current motor 3 exceeds the current limitation value Ilimit(L). As a result, the current supplied to the direct current motor 3 is limited to less than the current limitation value Ilimit(L).

The output of the OR gate 26 is inverted to the H-level during the period of turning off of the MOSFET 15 at the low side (H-level period of the output of the RS latch 22). The MOSFET 14 at the high side and the left side is turned on so that the energy remaining in the coil of the direct current motor 3 is circulated in the feedthrough path R1.

When the microcomputer 8 detects that the motor lock has disappeared and the throttle valve 2 is entering into the predetermined zone provided for the target throttle angle (timing ty in FIG. 5) during the current limitation operation period, the reset pulse Pr is produced to reset the timer 32.

Although FIG. 5 shows the operation in which the motor lock occurs during the drive start current supply, the same control is effected in the case of occurrence of motor lock during the braking.

As opposed to the case of motor lock (restored) shown in FIG. 5, the microcomputer 8 interrupts the current supply to the direct current motor 3, when the motor does not restore from the lock condition, that is, when the opening angle of the throttle valve 2 does not approach the target throttle angle under the condition that the current limitation operation is continued for a certain period. Specifically, the microcomputer 8 receives the current limitation condition monitor signal SL which is produced from the latch 33 shown in FIG. 3 to indicate that it is in the middle of the current limitation operation period, and counts the period in which the H-level signal indicating the current limitation operation continues.

The microcomputer changes all of its drive command signals A1–A4 to the L-level to interrupt the current supply to the direct current motor 3 at the time the counted period reaches the predetermined time period. That is, the MOSFETs 13–16 are turned off to interrupt the current to the motor and enters into the current supply interruption mode. Thus, the current supply to the direct current motor 3 is interrupted, when the angle of the throttle valve 2 does not approach the target throttle angle under the condition that the current limitation operation with the low current limitation value Ilimit(L) is continued for some time period.

In addition, the microcomputer 8 may count the time period in which the difference between the actual throttle angle and the target throttle angle in excess of the predetermined difference continues, and determines the motor lock when the counted time period reaches a predetermined time period. All the drive command signals A1–A4 are changed to the L-level to interrupt the current supply to the direct current motor 3.

As described with reference to FIGS. 5 and 6, the motor drive is continued with the current limitation under the motor lock condition to reduce the current flowing through the MOSFETs 13–16 which drive the motor.

The same control is effected when the motor lock occurs in the braking operation.

As described above, heat generation of the MOSFETs 13–16 can be reduced by limiting the current flowing in the MOSFETs 13–16 to the low current value Ilimit(L), when the current supplied to the direct current motor 3 continues to be more that the current limitation value Ilimit(H) for the time period t32 during the drive start current supply period (braking current supply period). Thus, the current can be continued to be supplied to the direct current motor 3 for some time period even under the motor lock condition. The motor can be restored to the normal condition by the continuation of applying the drive torque for some time when the lock condition is temporary and light. As the heat generation of the MOSFETs 13–16 are reduced, the MOSFETs 13–16 can be sized small and reduced in cost. As a result, the drive circuit 9 can be constructed in low cost without lessening the drive response characteristics of the throttle valve 2.

In the above embodiment, the drive logic circuit 19 as first and second current limitation means limits the current value (current flowing in the motor) detected by the current detection circuit 10 at the time of motor drive start and braking not to exceed the first current limitation value Ilimit(H). It further limits the current value (current flowing in the motor) detected by the current detection circuit 10 not to exceed the second current limitation value Ilimit(L) lower than the first current limitation value Ilimit(H) at the time of continuation of the above current limitation in excess of the predetermined time period (that is, it is detected that continuation of the current limitation by the current limitation value Ilimit(H) for the predetermined time period t32 in excess of at least the drive start or braking time period).

More specifically, the current supply is interrupted for the fixed time period t22 when the motor current supply reaches the limitation value. By this interruption, the current value (current flowing in the motor) detected by the current detection circuit 10 is limited not to exceed the first current limitation value Ilimit(H). Further, by monitoring the current supply interruption operation at every predetermined time interval, the current (current flowing in the motor) detected by the current detection circuit 10 is limited not to exceed the second current limitation value Ilimit(L) when the current supply interruption operation continues for the predetermined time period t32.

Here, the timer operation at the time of the current limitation operation with the current limitation value Ilimit(H) is reset, when the microcomputer 8 as the reset means detects switching of the motor current supply direction. Therefore, erroneous current limitation is prevented in the present system, even when the drive start and braking occur in succession.

Figure 26:
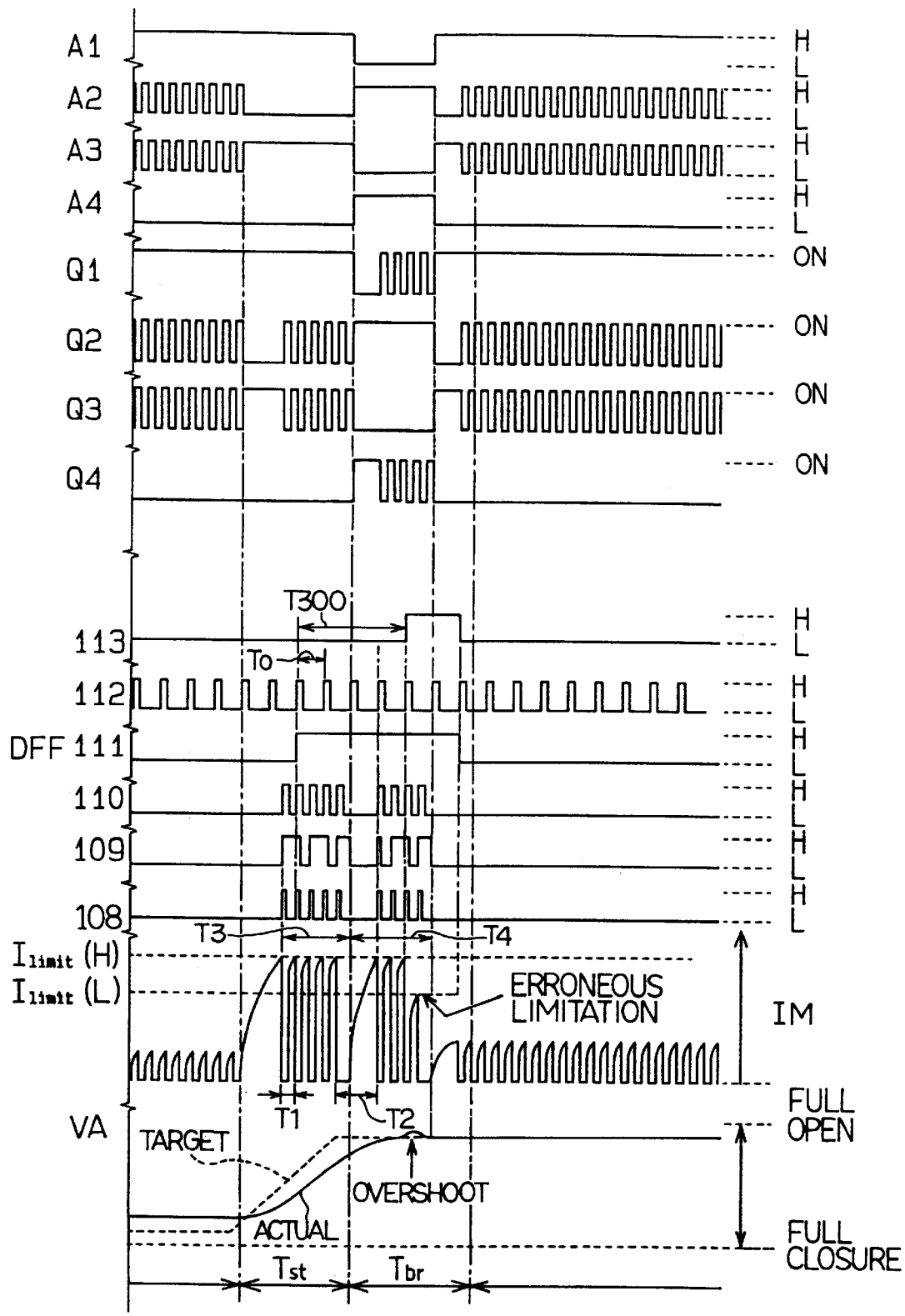
FIG. 26 is a timing diagram showing an operation of the conventional apparatus under a lock condition.

That is, if the switching time period T2 between the drive start current supply to the braking current supply is short in the case that the history of whether the current has reached the current limitation value within the period longer than the switching period T1 under the current limitation operation is stored to check the lock condition as shown in FIG. 26, it is erroneously determined that the current limitation operation is continuing due to the sum of the limitation period T3 in the drive start current supply period Tst and the limitation period T4 in the braking current supply period Tbr (T3+T4>T300). Thus, the output torque at the time of braking current supply is reduced, and the valve position will undergo an overshoot. If the intermediate time period Tre is provided when the current supply is switched from the drive start to braking to avoid the above problem, for instance, the delay occurs in braking operation and overshoot occurs due to the insufficient braking force.

According to the present embodiment, however, the microcomputer 8 as the reset means detects switching of the motor current supply direction. When the current supply direction is switched, the timer operation is reset. Thus, although the counted time period of the counter exceeds the predetermined value and the output torque is reduced at the time of braking current supply causing the throttle valve position to overshoot when the drive start current supply and the braking current supply occur in succession, the microcomputer 8 (reset means) detects switching from the drive start current supply to the braking current supply by detecting switching of the current supply direction and resets the counting operation (timer operation) of the predetermined time period. Therefore, even when the drive start current supply and the braking current supply occurs in succession, the counted time period does not exceed the predetermined value and a sufficient output torque can be produced at the time of the braking current supply. Thus, it is prevented that the position of the throttle valve overshoots.

As described above, erroneous current supply restriction (erroneous current limitation) is prevented in the motor drive apparatus having the current limitation function (function of limiting the supply current value) which starts to drive and brake with high torque upon approaching the target position.

In the above description, the current limitation operation is controlled by the drive logic circuit 19 constructed in hardware. The current limitation operation may alternatively be attained by the program control of the microcomputer. Further, the drive circuit 9 in the H-bridge type may be constructed with switching devices other than MOSFETs 13–16. Thus, the above embodiment is not limited to the electronic throttle control system but may be applied to other apparatuses which use the direct current motor as a drive source.

(Second Embodiment)

The second embodiment is described next with reference to the difference from the first embodiment. According to this embodiment, however, the timer operation for the current limitation is reset when the current supply direction is switched by a hardware construction.

Figure 8:
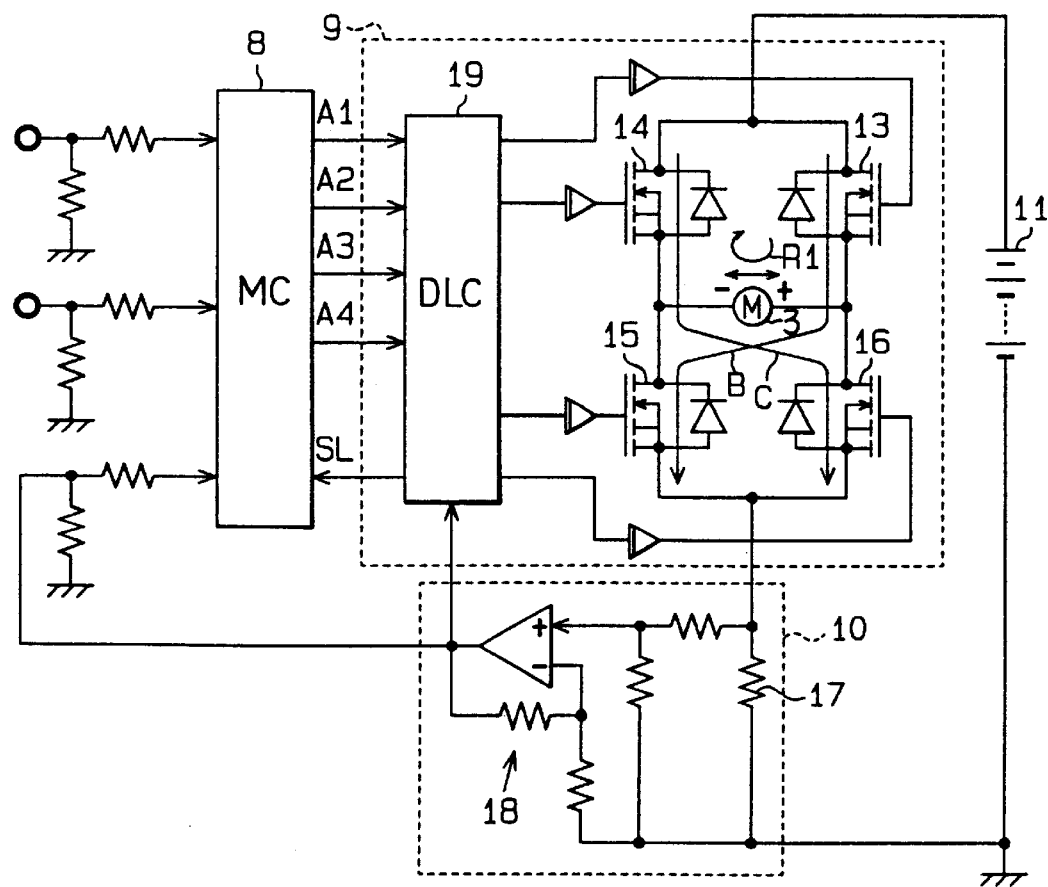
FIG. 8 is an electric circuit diagram showing the drive circuit according to a second embodiment of the present invention.

More detailed description is made with reference to FIG. 8. It is checked whether the direction of drive current supply is a B-side or C-side from the drive command signals A1–A4 produced from the microcomputer 8, so that the phase of the drive current supply may be detected in the motor drive circuit 9. The current supply through the circulation path R1 is effected by the MOSs 13 and 14 at the high side. The drive command signals A1 and A2 for the high side MOSs become H-level which turns on during the current supply circulation time, even when the drive current supply phases of the same are not in the current supply direction B and C, respectively. As a result, the direction is not easily determined.

It is therefore appropriate to determine the current supply phase from the signals A3 and A4, because the drive command signals A3 and A4 for the MOSs 15 and 16 at the low side. Further, storage means is provided to store the previous current supply phase as a reference for comparison so that the change is checked. In addition, means is provided to produce a signal indicative of disagreement between the stored previous current supply phase and the present current supply phase.

The detailed circuit construction is described next with reference to FIG. 9.

Figure 9:
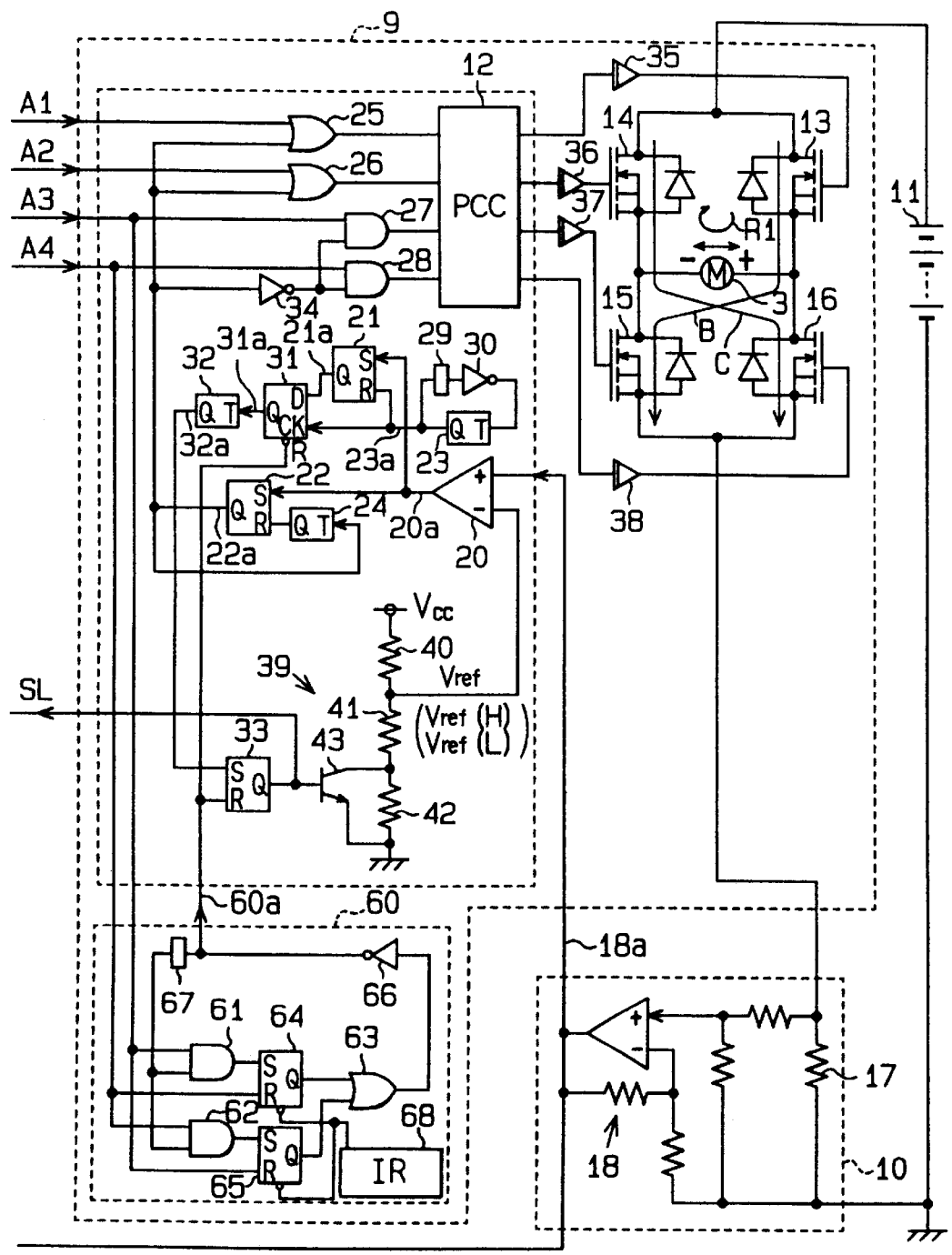
FIG. 9 is a detailed electric circuit diagram showing the drive circuit shown in FIG. 8.

A reset pulse generator circuit 60 is provided as shown in FIG. 9. The circuit 60 receives the low side drive command signals A3 and A4 at input terminals S of latches 64 and 65 through AND gates 61 and 62. Other input terminals of the AND gates 61 and 62 are both connected to the output of a delay 67, so that one of the latches which is at the side of the drive command signal of H-level is set during the output of the delay 67 is at the H-level.

That is, when the current supply direction is B, the drive command signal A3 becomes the H-level and the latch 64 is set through the AND gate 61. When the current supply direction is C, the drive command signal A4 becomes the H-level and the latch 65 is set through the AND gate 62. Thus, each direction of the current supply is stored.

On the other hand, the input terminals R of the latches 64 and 65 are connected to receive the drive command signals A4 and A3, respectively, which are opposite to the signals applied to the input terminals S. The latch is reset when the drive command signal opposite to the current supply direction set in corresponding to each latch becomes the H-level. That is, the drive command signal A3 becomes the H-level and the latch 65 is reset, when the current supply direction is B. The drive command signal A4 becomes the H-level and the latch 64 is reset, when the current supply direction is C. Thus, each latch is reset when the current supply direction is switched from the previous direction stored in the same.

As described above, the current supply direction B is stored when the latch 64 is set, while the current supply direction C is stored when the latch 65 is set.

The output terminals Q of the latches 64 and 65 are connected to an OR gate 63, and the output of the OR gate 63 is applied to the delay 67 through a NOT gate 66. The OR gate 63 produces the H-level when the output terminal Q of either latch is at the H-level, and a NOT gate 66 inverts it to the L-level. The L-level is applied to the input terminals S of the latches 64 and 65 irrespective of the drive command signals A3 and A4. The OR gate 63 produces the L-level when both output terminals Q of the latches 64 and 65 are at the L-level, and the NOT gate 66 inverts it to the H-level. The H-level signal is applied to both input terminals of the AND gates 61 and 62 through the delay 67, and the drive command signals A3 and A4 are applied to the input terminals S of the latches 64 and 65.

That is, when the current supply direction is switched, the current supply direction once stored in the latches 64 and 65 is set. Specifically, the latch storing the current supply direction is reset, the H-level signal is supplied to the delay 67 through the OR gate 63 and the NOT gate 66. The H-level signal is applied to the AND gate 61 and 62 after the time period set by the delay 67, and the drive command signals are applied to the input terminals S of the latches 64 and 65.

After the setting, the OR gate 63 produces the H-level signal again and the NOT gate 66 produces the L-level signal. The L-level signal is applied to both AND gate 61 and 62 through the delay 67 to disable the latches 64 and 65 from being set. As a result, when the current supply direction is switched, the H-level signal is produced to the NOT gate 66 for the period set by the delay 67, so that this signal may be produced as a reset pulse at the time of switching the current supply direction.

Thus, the motor is connected in the H-bridge using four switching devices (MOSFETs 13–16). The latches 64 and 65 (latch means) temporarily store the drive command signals A3 and A4 corresponding to the switching devices (MOSFETs 15 and 16) of the drive signals A1–A4 corresponding to four switching devices (MOSFETs 13–16). The MOSFETs 15 and 16 are not controlled to circulate the current. The output of the NOT gate 66 is applied to the reset terminal R of the flip-flop 31 and the reset terminal R of the latch 33.

In the reset pulse generator circuit 60 shown in FIG. 9, an initial reset circuit 68 is provided to initially reset the latches 64 and 65.

Figure 10:
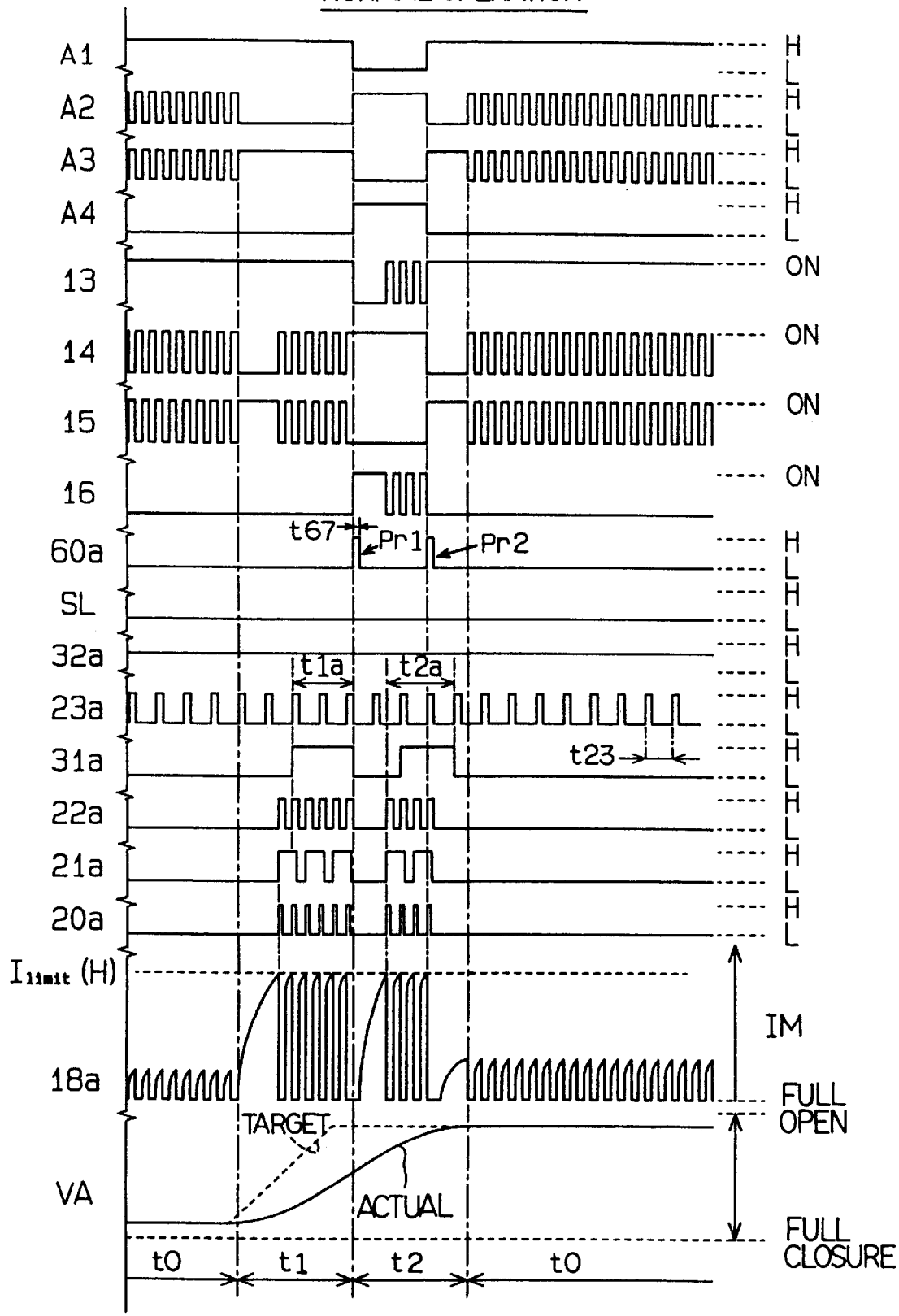
FIG. 10 is a timing diagram showing an operation of the second embodiment under the normal condition.

FIG. 10 shows an operation at the normal time. In this instance, as described with reference to FIG. 4, the current limitation operation with the current limitation value Ilimit (H) is effected during the drive start and braking current supply periods.

Further, when the drive command signal A4 becomes the H-level upon switching from the drive start current supply (period t1) to the braking current supply (period t2), the reset pulse generator circuit 60 provided in the drive circuit responsively produces the reset pulse Pr1 which is at the H-level during the predetermined time period t67. The flip-flop 31 (timer 32) and the latch 33 provided in the drive circuit 9 are reset. Thus, the timer 32 counting the current limitation continuation period is reset, so that the counting does not continue between the drive start current supply and the braking current supply and the current limitation operation due to erroneous determination is not effected.

In the similar manner, the current supply direction is changed at the time of ending the braking current supply so that a reset pulse Pr2 is produced.

As described above, the reset pulse generator circuit 60 which detects a change in the phases of the drive current supply is provided in the motor drive circuit 9. Therefore, as evident from comparison of FIG. 8 and FIG. 2, the embodiment of FIG. 8 is effective to eliminate a signal line for transmitting the reset command signal SR in FIG. 2 while it is not in the first embodiment. Thus, the number of lines (number of signal lines) between the microcomputer 8 and the driver circuit 9.

That is, a reset signal line from the microcomputer is not necessitated in comparison with the case in which the reset means is provided by the processing in the microcomputer.

(Third Embodiment)

The third embodiment is described next with reference to the difference from the first embodiment.

Figure 11:
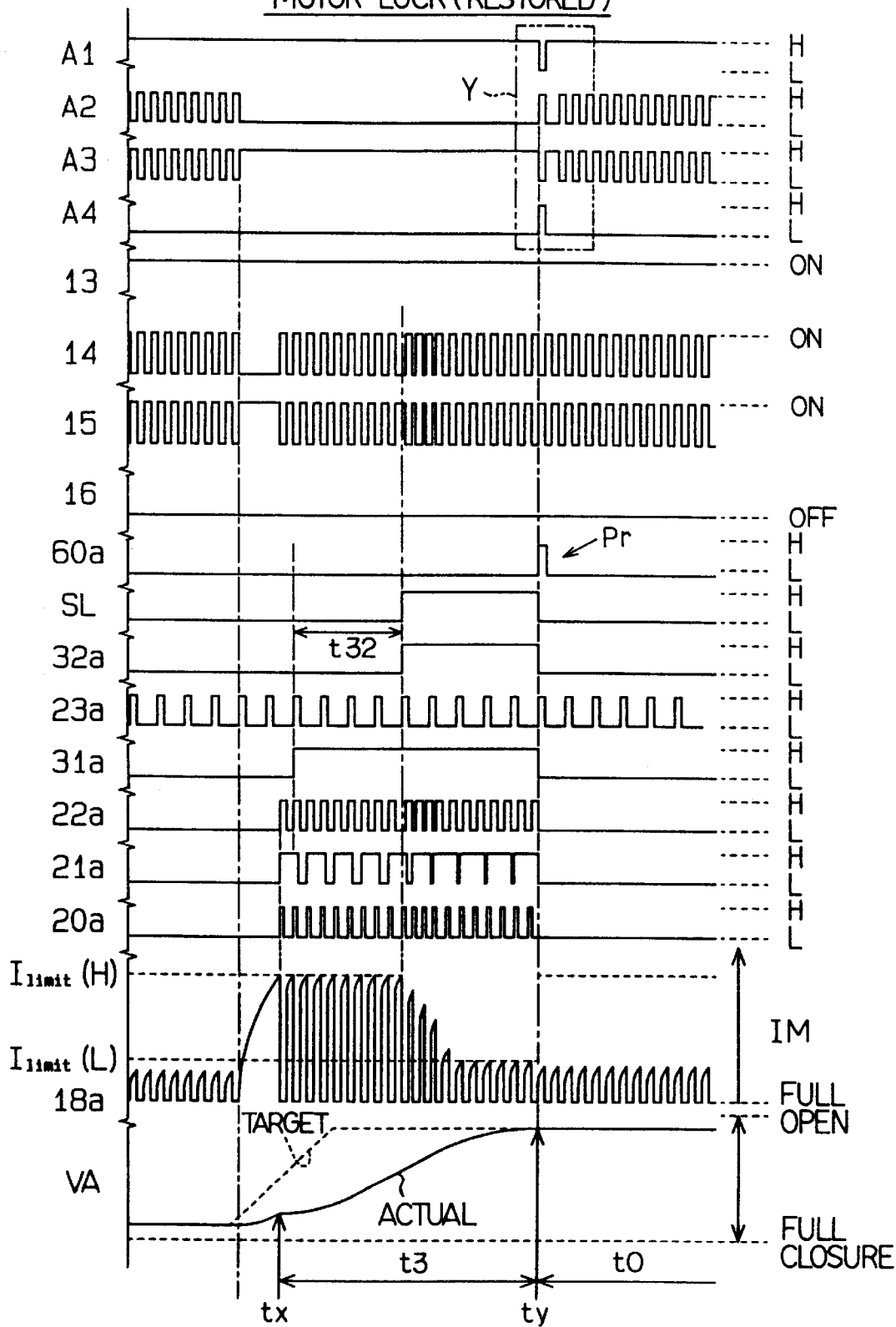
FIG. 11 is a timing diagram showing an operation of a third embodiment of the present invention under the motor lock condition.

FIG. 11 shows a timing diagram of this embodiment. That is, FIG. 11 shows an operation under the motor lock (restored) and FIG. 12 shows an enlarged signal in the part Y in FIG. 11.

Further, the circuit construction of this embodiment is the same as that shown in FIGS. 8 and 9. The reset pulse generator circuit 60 in FIG. 9 is used to an extraction circuit which extracts the reset command signal superimposed on the drive command signals A3 and A4 form the microcomputer 8.

Figure 12:
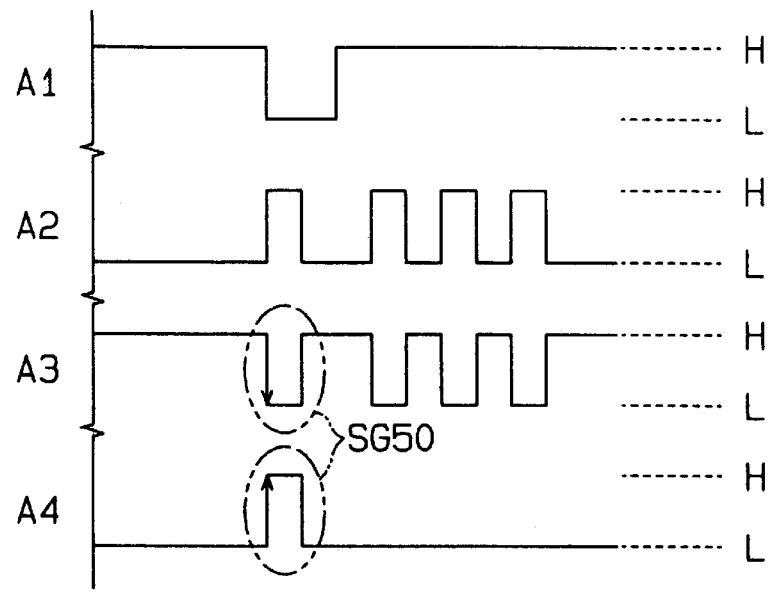
FIG. 12 is an enlarged timing diagram showing signal an operation of the third embodiment.

In the third embodiment, as shown in FIG. 12, the drive command signals A3 and A4 are superimposed with signals (signals for reversing the direction once) SG50 as the reset signal and applied to the drive circuit 9. The extraction circuit (circuit constructed in the same manner as the reset pulse generator circuit 60 in FIG. 9) which separates the signals SG50 in the driver circuit 9 is provided, so that the timer operation may be reset (current limitation operation is cancelled). The process of superimposing the signals SG50 is executed by the microcomputer 8.

Thus, the signals SG50 for resetting the timer operation are superimposed in the microcomputer 8 on the drive command signals A3 and A4 applied from the microcomputer 8 to the drive circuit 9, and the extraction circuit 60 is provided in the drive circuit 9 to extract the signal SG50 for resetting. Thus, the signal line which transmits the reset command signal SR is eliminated in comparison with the case in which the signal for resetting the counting operation (timer operation) of the predetermined time period from the microcomputer 8 to the drive circuit 9, and the number of lines is reduced. That is, the signal line for transmitting the reset command signal SR in FIG. 2 can be eliminated to reduce the number of lines (number of signal lines).

(Fourth Embodiment)

The fourth embodiment is described next with reference to the difference from the third embodiment.

Figure 13:
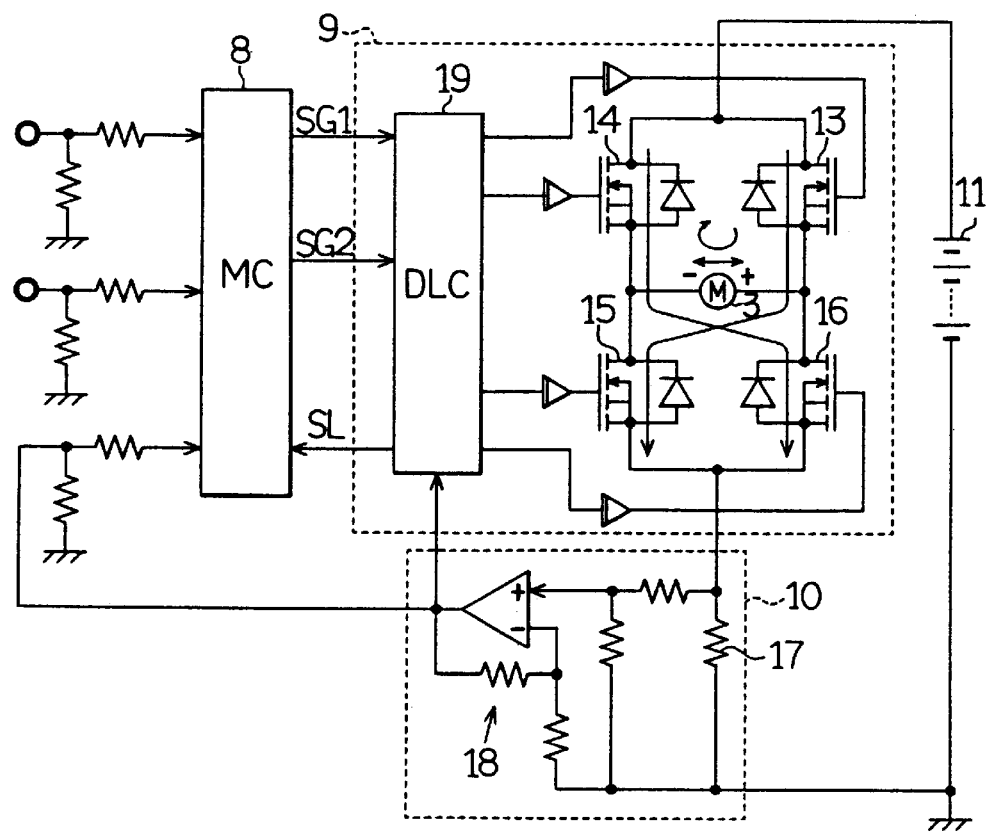
FIG. 13 is an electric circuit diagram showing the drive circuit according to a fourth embodiment of the present invention.
Figure 14:
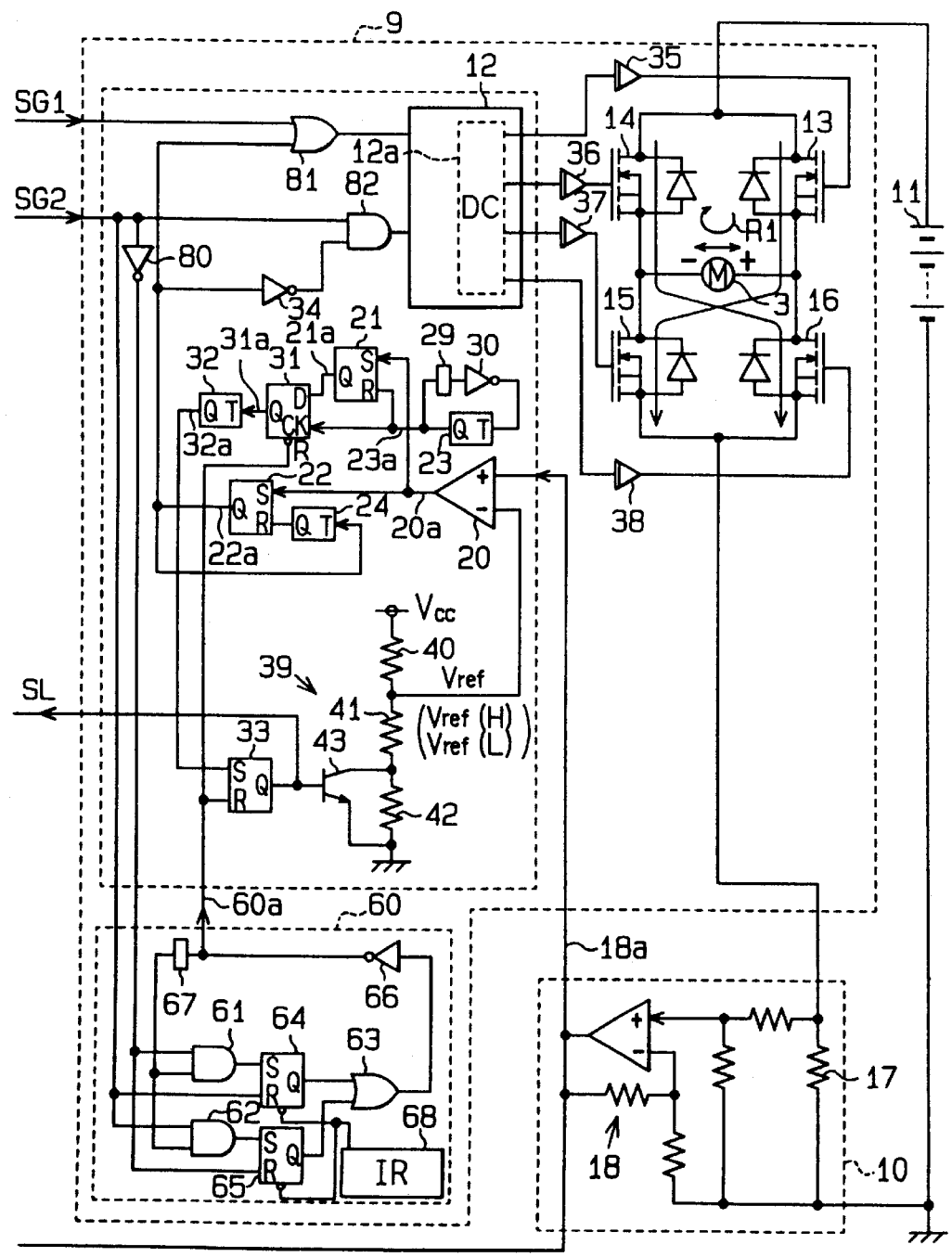
FIG. 14 is a detailed electric circuit diagram showing the drive circuit shown in FIG. 13.

FIG. 13 shows the construction of the microcomputer 8 and the drive circuit 9 according to the present embodiment, and FIG. 14 shows the details of the drive circuit 9. Further, FIG. 15 shows a timing diagram at the time of motor lock.

In FIG. 13, the microcomputer 8 applies a signal SG1 which indicates a duty ratio for a motor drive and a signal which indicates a direction of motor rotation to the drive circuit 9. As shown in FIG. 14, the protective control circuit 12 in the drive circuit 9 has a distribution circuit 12a. The distribution circuit 12a receives the signals SG1 and SG2 from the microcomputer 8 through an OR gate 81 and an AND gate 82, and produces the drive signals for the FETs 13–16. Further, in FIG. 14, the extraction circuit (circuit 60 denoted with numerals 60 in FIG. 9) is connected to the SG2 signal lines through two lines. An inverter 80 is connected in one of the lines.

Figure 15:
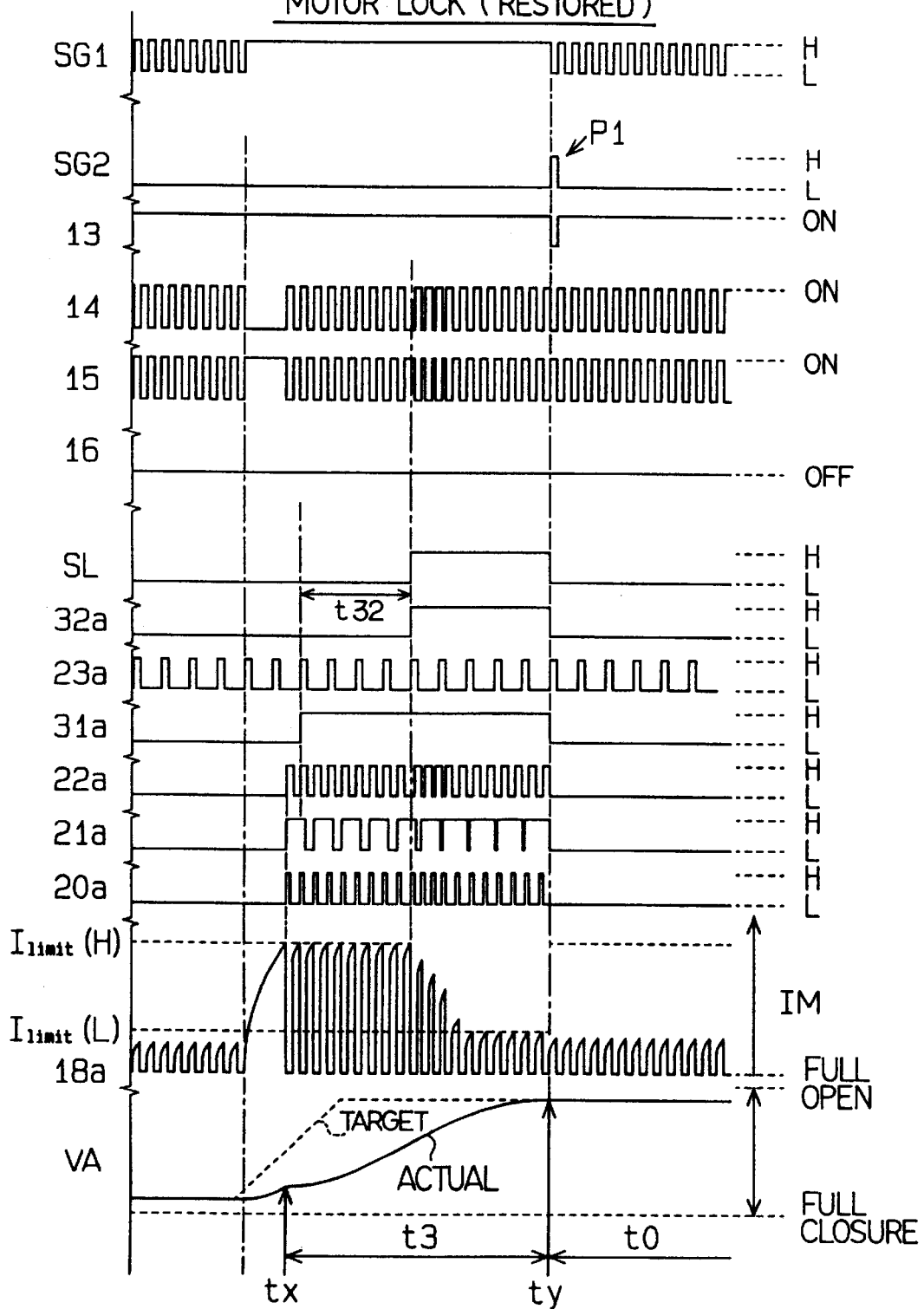
FIG. 15 is a timing diagram showing signal waveforms under the motor lock condition.

As shown in FIG. 15, the microcomputer 8 superimposes a pulse P1 (pulse for canceling the current limitation on the motor under the current limitation condition) which resets the timer operation on the signal SG2 which indicates the direction of motor rotation. This pulse P1 is extracted in the extraction circuit 60 to reset the current limitation operation.

Thus, the number of lines (number of signal lines) between the microcomputer 8 and the drive circuit 9 can be reduced.

(Fifth Embodiment)

The fifth embodiment is described next with reference to the difference from the first embodiment.

The fifth embodiment, is directed to a system in which no current limitation is effected during the drive start period or the braking period. This embodiment is described in detail with reference to FIGS. 16–18.

Figure 16:
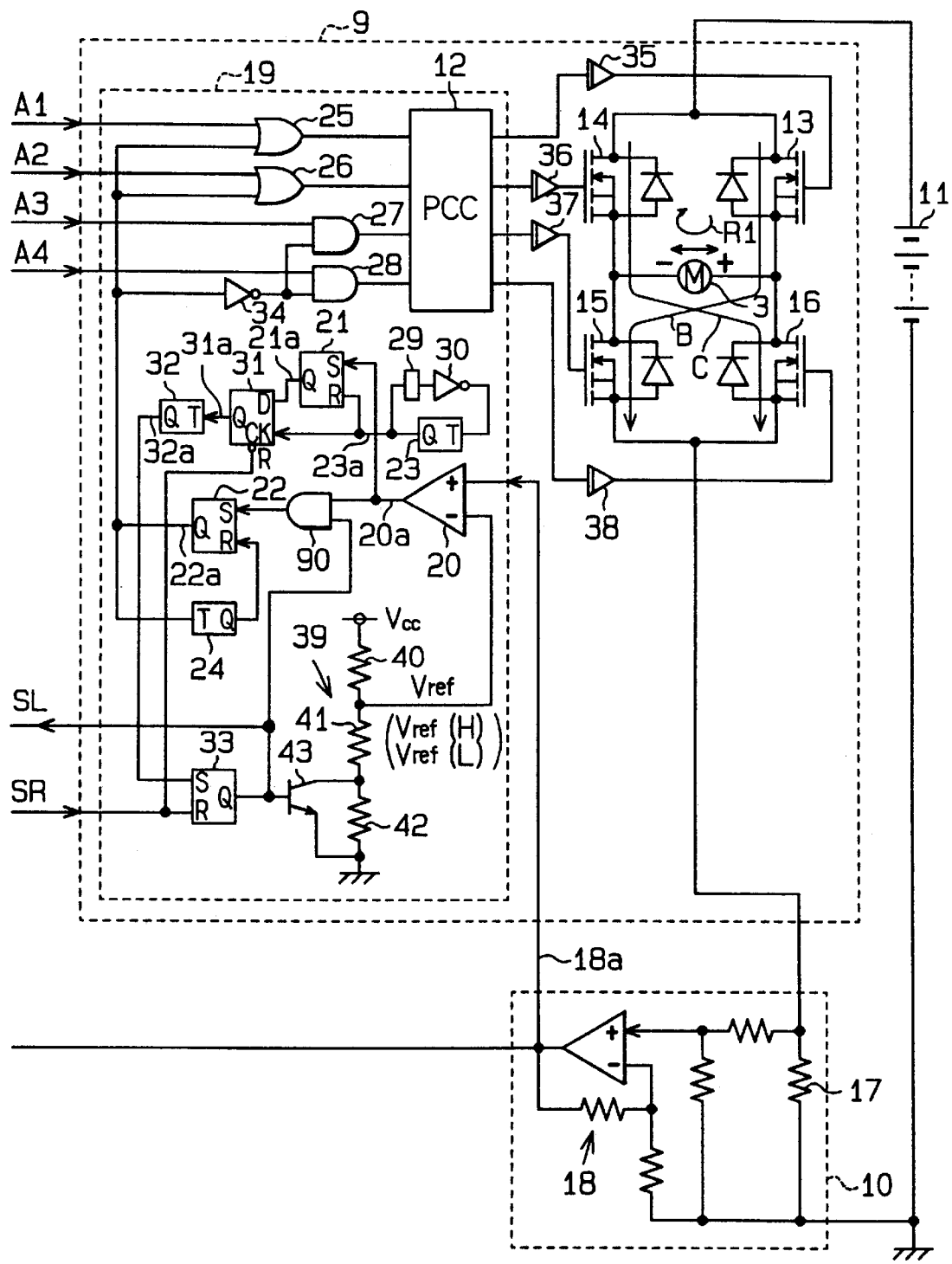
FIG. 16 is a detailed electric circuit diagram showing the drive circuit according to a fifth embodiment of the present invention.

In FIG. 16 showing the drive circuit, an AND gate 90 is provided between the comparator 20 and the set terminal S of the latch 22 shown in FIG. 3. The output terminal Q (SL signal line) of the latch 33 is connected to the other terminal of the AND gate 90.

According to this construction, the timer 32 counts a period in which the current in excess of the current Ilimit(H) corresponding to the high reference voltage Vref(H) continues to flow. When it is determined that the excessive current continues to flow for the predetermined time period, the output terminal Q (SL signal line) of the timer 32 changes to the H-level and the latch 33 is set to produce the H-level at its output terminal Q (SL signal line). Following this, the reference voltage is switched to the low reference voltage Vref(L). The AND gate 90 produces to the terminal S of the latch 22 a signal corresponding to the output signal of the comparator 20 thereby to start the current limitation operation with the low reference voltage Vref(L). Thus, although no current limitation is effected at the time of drive start and braking, the lock condition is determined from the continuation of excessive current for the predetermined time period thereby to limit the current to the lower value at the time of lock.

Figure 17:
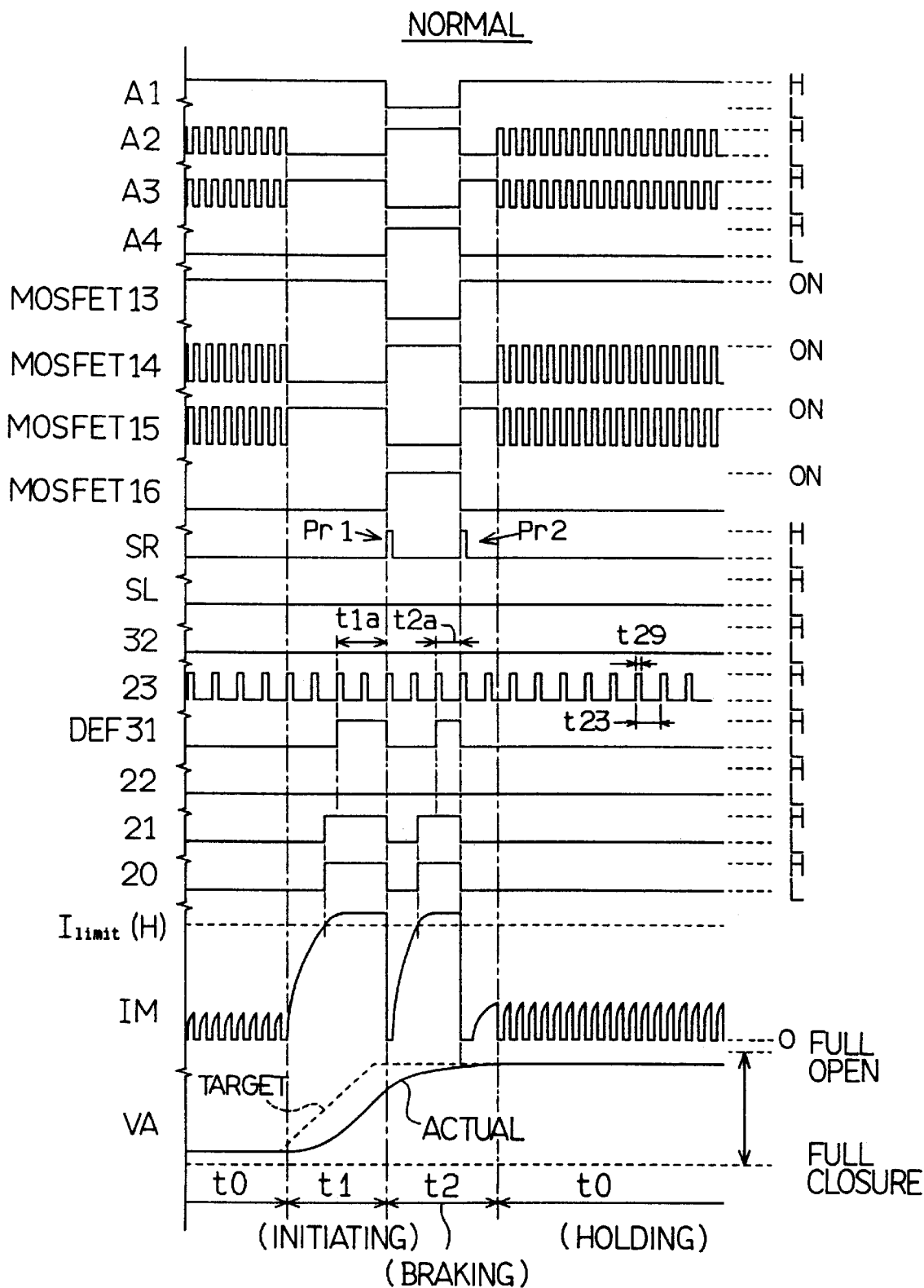
FIG. 17 is a timing diagram showing an operation of the fifth embodiment under the normal condition.

FIG. 17 shows an operation at the time of drive start and braking current supply under the normal condition. The motor is supplied with the current based on the drive command signals A1–A4 produced from the microcomputer 8. The reset command signal SR (H-level pulse Pr1) is produced at the timing when the current supply is switched to the braking current supply after the drive start current supply. Thus, the flip-flop 31 is reset to produce the L-level form its terminal Q (output terminal 31a). The counting operation of the timer 32 is temporarily reset, thus preventing the erroneous determination.

As described above, the microcomputer 8 checks changes in the current supply phases and produces the reset signal to reset the excessive current continuation determination timer 32 each time the change occurs. Thus, erroneous determination caused when the current limitation determination timer 32 continues its counting operation between the start drive current supply and the braking current supply is prevented.

As the current supply direction is changed at the time of ending the braking current supply as well, the reset command signal SR (H-level pulse Pr2) is produced.

Figure 18:
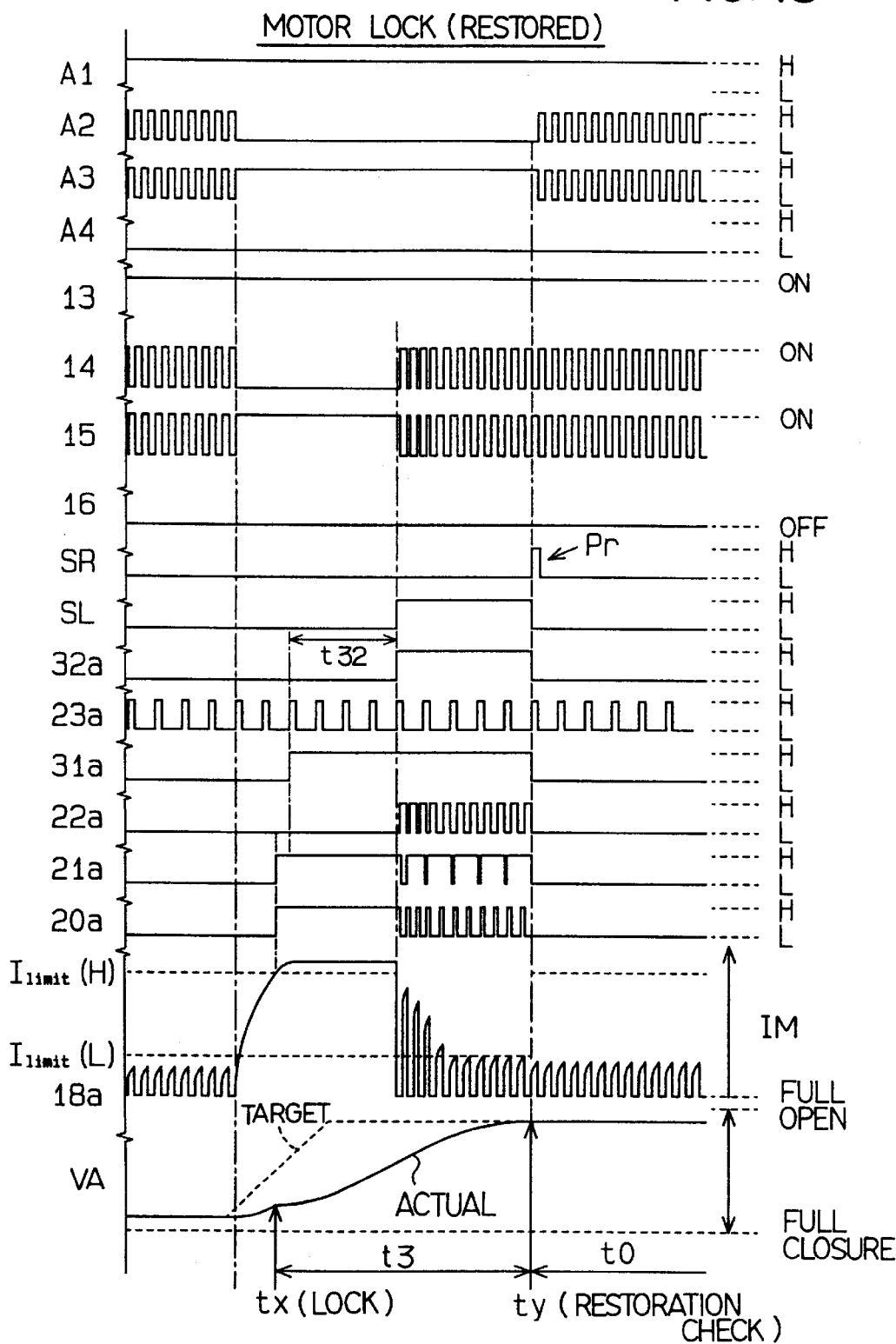
FIG. 18 is a timing diagram showing an operation of the fifth embodiment under the lock condition.

FIG. 18 shows an operation of the current limitation and restoration under the lock condition. When the lock occurs immediately after the drive start current supply and the current continues to exceed the high limitation value Ilimit (H), the timer 32 counts the predetermined time period t32 and produces the H-level at its terminal Q (output terminal 32a). The latch 33 is set so that the SL signal changes to the H-level to indicate continuation of the large current.

Thus, the reference voltage Vref is switched to the low reference voltage Vref(L) corresponding to the low current limitation value Ilimit(L) by the transistor 43. The H-level is applied to the AND gate 90, and the output signal of the comparator 20 is applied to the terminal S of the latch 22 so that the current limitation operation is started. When restoration of the valve operation is detected after that, the reset command signal SR (H-level pulse Pr) is produced for restoration from the current limitation.

As an application, this embodiment can be applied to a system which has a circuit (reset pulse generation circuit 60 shown in FIG. 9) within the drive circuit for detecting the change in the current supply phases from the drive command signals A1–A4 and generating the reset pulse as described in the second embodiment in place of generating the reset pulse by the processing (software) of the microcomputer 8.

(Sixth Embodiment)

The sixth embodiment is described next with reference to the difference from the fifth embodiment. In the present embodiment, the current supply is interrupted at the time of continuation of the large current not to supply the current. That is, this embodiment is directed to a system which interrupts the current supply at the time of continuation of the excessive current in addition of not limiting the current as in the fifth embodiment.

This embodiment is described in detail with reference to FIGS. 19–21.

Figure 19:
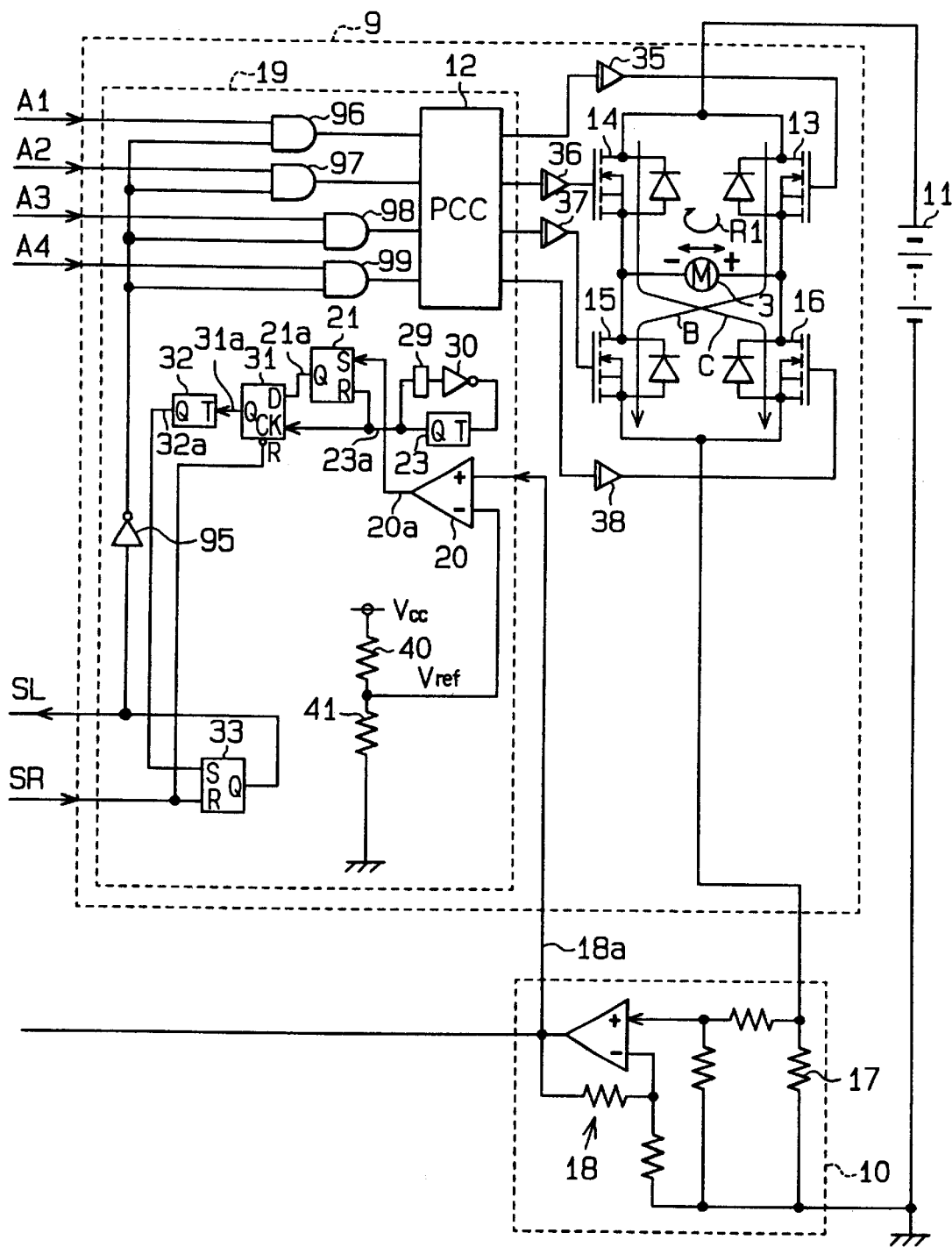
FIG. 19 is a detailed electric circuit diagram showing the drive circuit according to a sixth embodiment of the present invention.

In FIG. 19 showing the construction of the drive circuit, the current limitation circuit (circuit comprising devices indicated by numerals 22, 24, 42, 43 in FIG. 3) is eliminated as opposed to FIG. 3. Further, AND gates 96, 97, 98 and 99 are provided for A1–A4 lines (drive command signal lines), and the terminal Q (SL signal) line of the latch 33 is connected to the AND gates 96, 97, 98 and 99 through a NOT gate 95. Thus, the command of the drive command signals A1–A4 (control signals) are put to the current interruption condition by the SL signal.

Specifically, the timer 32 counts the time period in which the current in excess of the reference voltage Vref continues to flow. When the excessive current continues for the predetermined time period, it is determined to be the limit time of the lock current limitation. The timer 32 produces the H-level at its terminal Q (output terminal 32a) to set the latch 33. Thus, the H-level is produced from the output terminal Q (SL signal line), and applied to the AND gate 96, 97, 98 and 99 after being inverted to the L-level by the NOT gate 95. As a result, the drive command signal lines (A1–A4) are interrupted. That is, conduction of the MOSFETs 13–16 are interrupted and held interrupted. This interruption condition is cancelled by the reset command signal SR.

Figure 20:
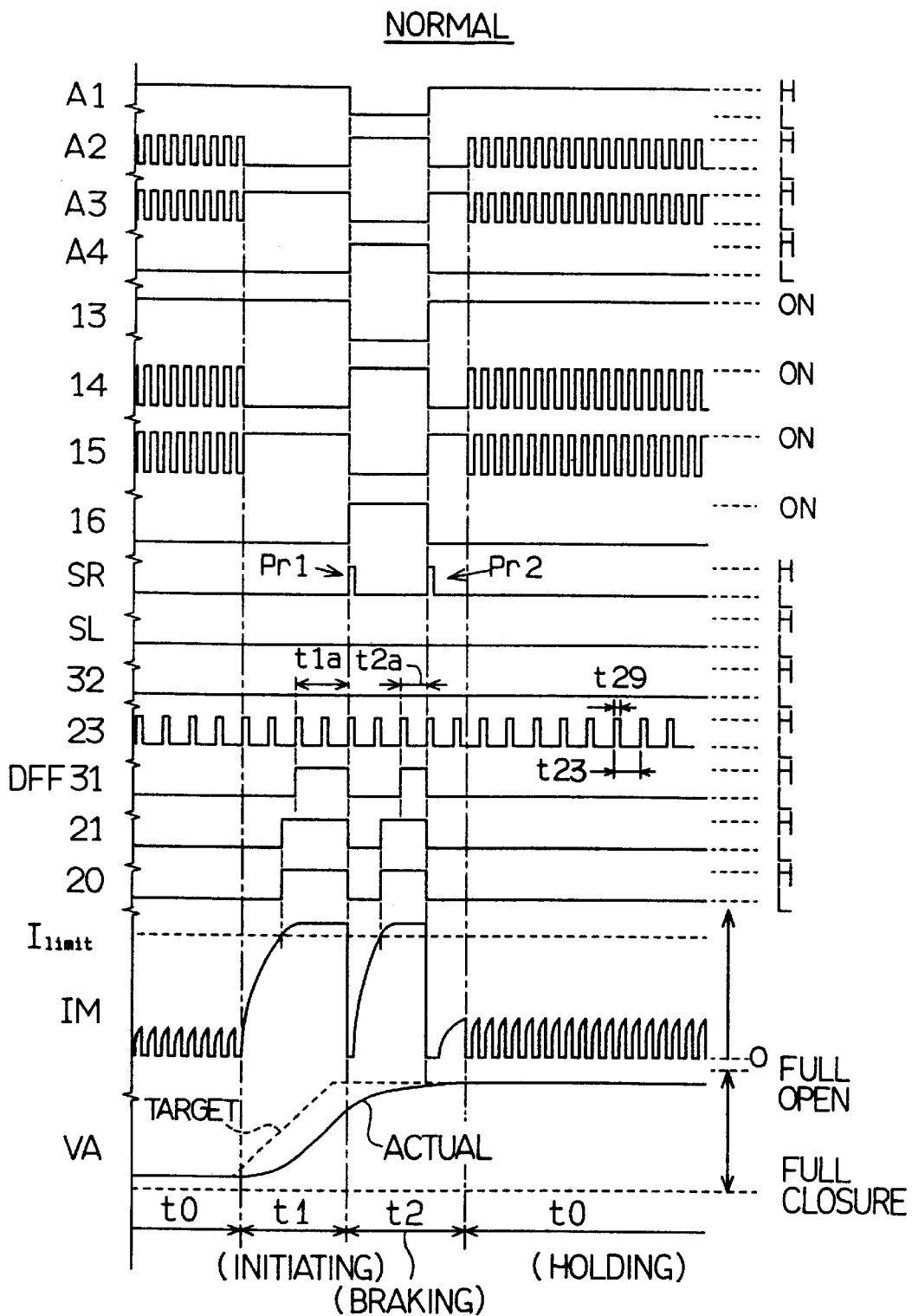
FIG. 20 is a timing diagram showing an operation of the sixth embodiment under a normal condition.

FIG. 20 shows an operation at the time of drive start and braking current supply under normal condition.

The current supply to the motor 3 is controlled in response to the drive command signals A1–A4, and the reset command signal SR (H-level pulse Pr1) is produced at the timing when the current supply is switched to the braking current supply after the drive start current supply. Thus, the flip-flop 31 is reset and produces the L-level at its terminal Q (output terminal 31a). The counting operation of the timer 32 is temporarily reset to prevent erroneous determination.

Thus, the change in the current supply phases is detected by the microcomputer 8, and the reset command signal SR is produced to reset the excessive current continuation determination timer 32 when the phase change occurs. As a result, the erroneous determination which arises when the current limitation determination timer 32 continues its counting operation from the drive start current supply to the braking current supply can be avoided.

Further, as the direction of current supply at the time of the end of braking current supply, the reset command signal SR (H-level pulse Pr2) is also produced.

Figure 21:
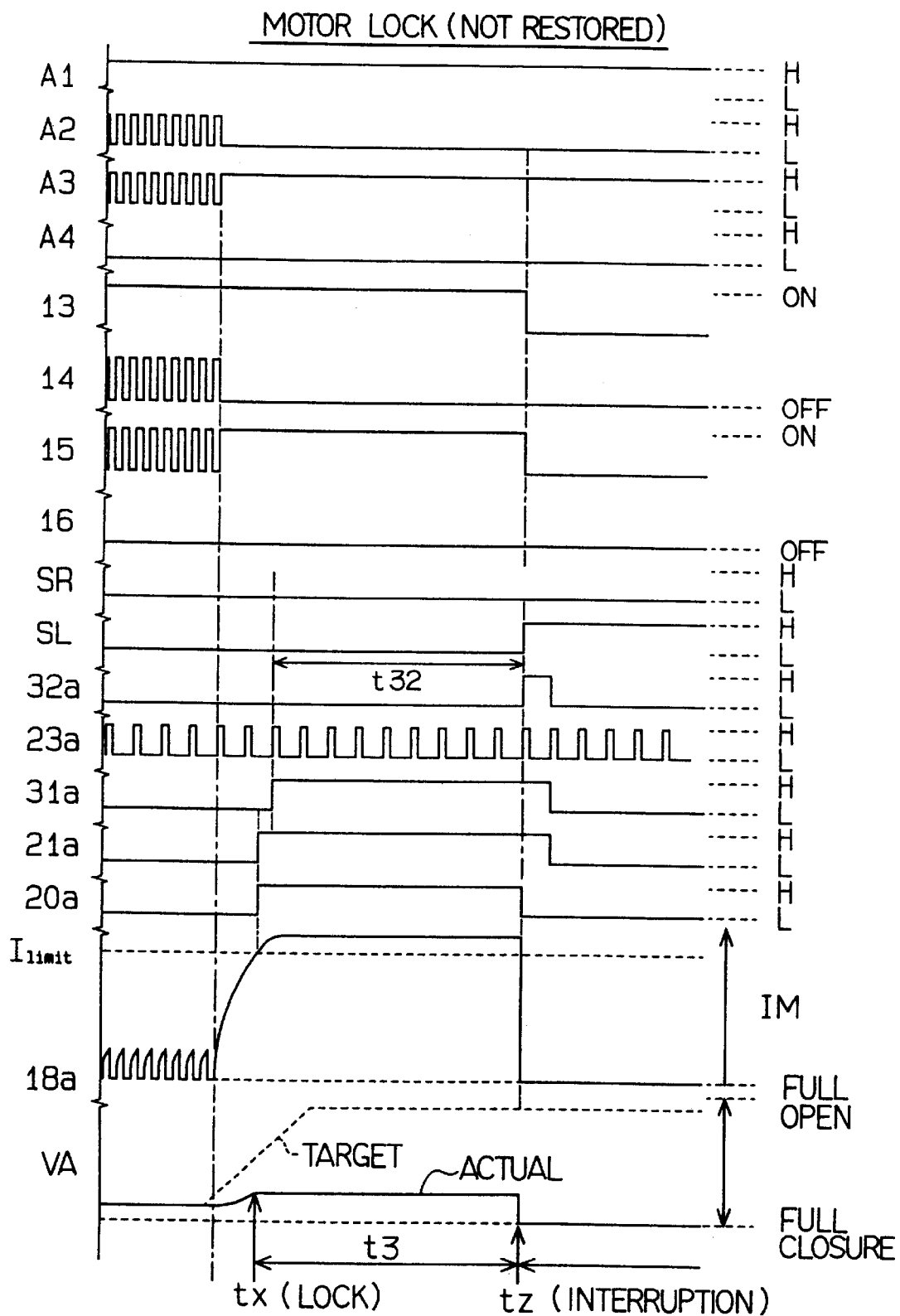
FIG. 21 is a timing diagram showing an operation of the sixth embodiment under the lock condition.
Figure 22:
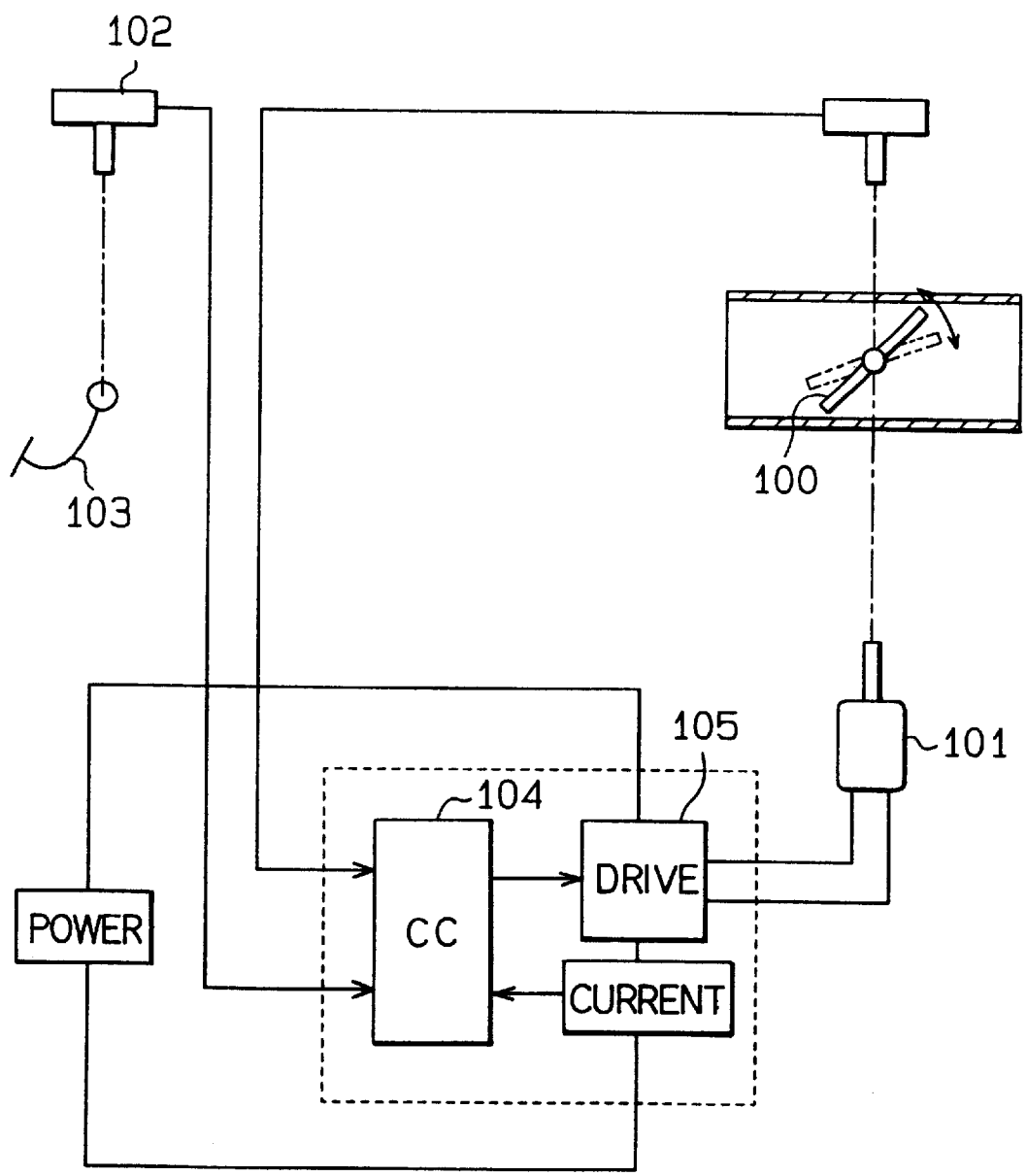
FIG. 22 is a block diagram showing a conventional electronic throttle control apparatus.
Figure 23:
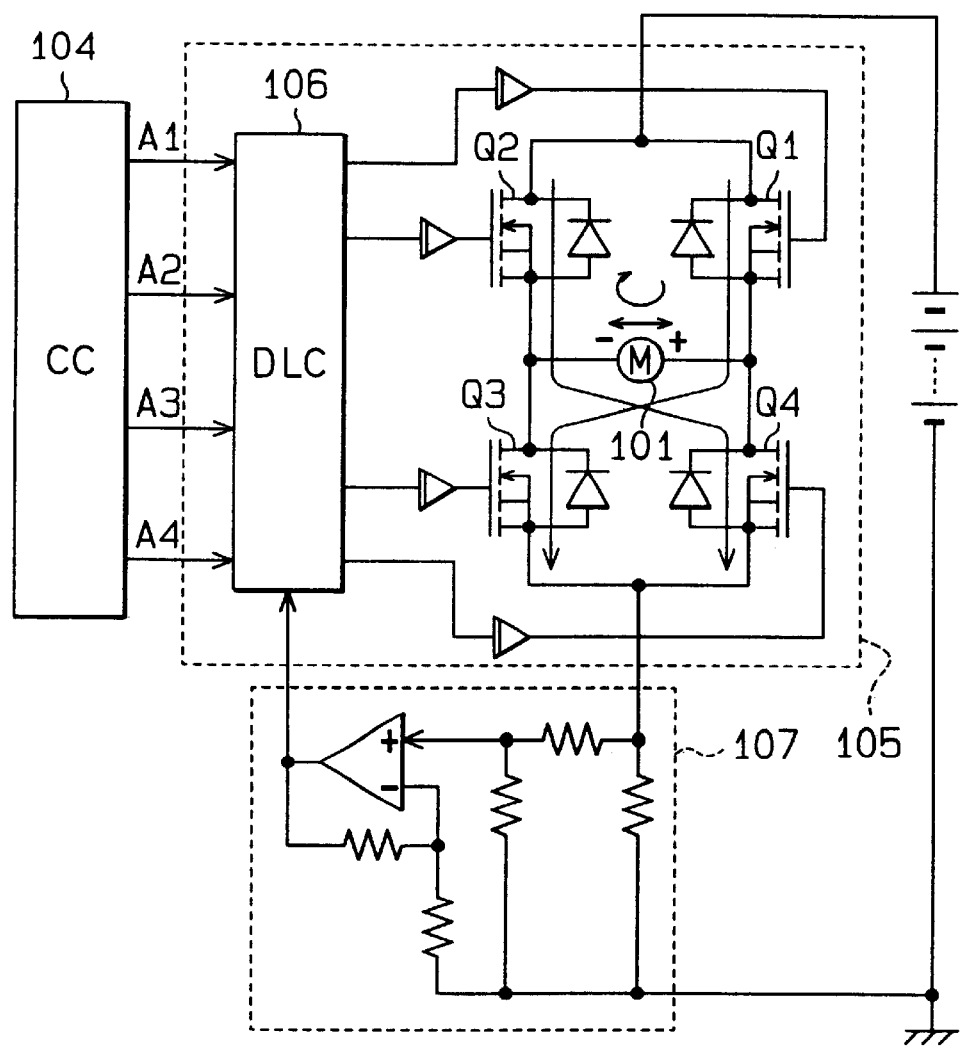
FIG. 23 is an electric circuit diagram showing the drive circuit used in the conventional apparatus.
Figure 24:
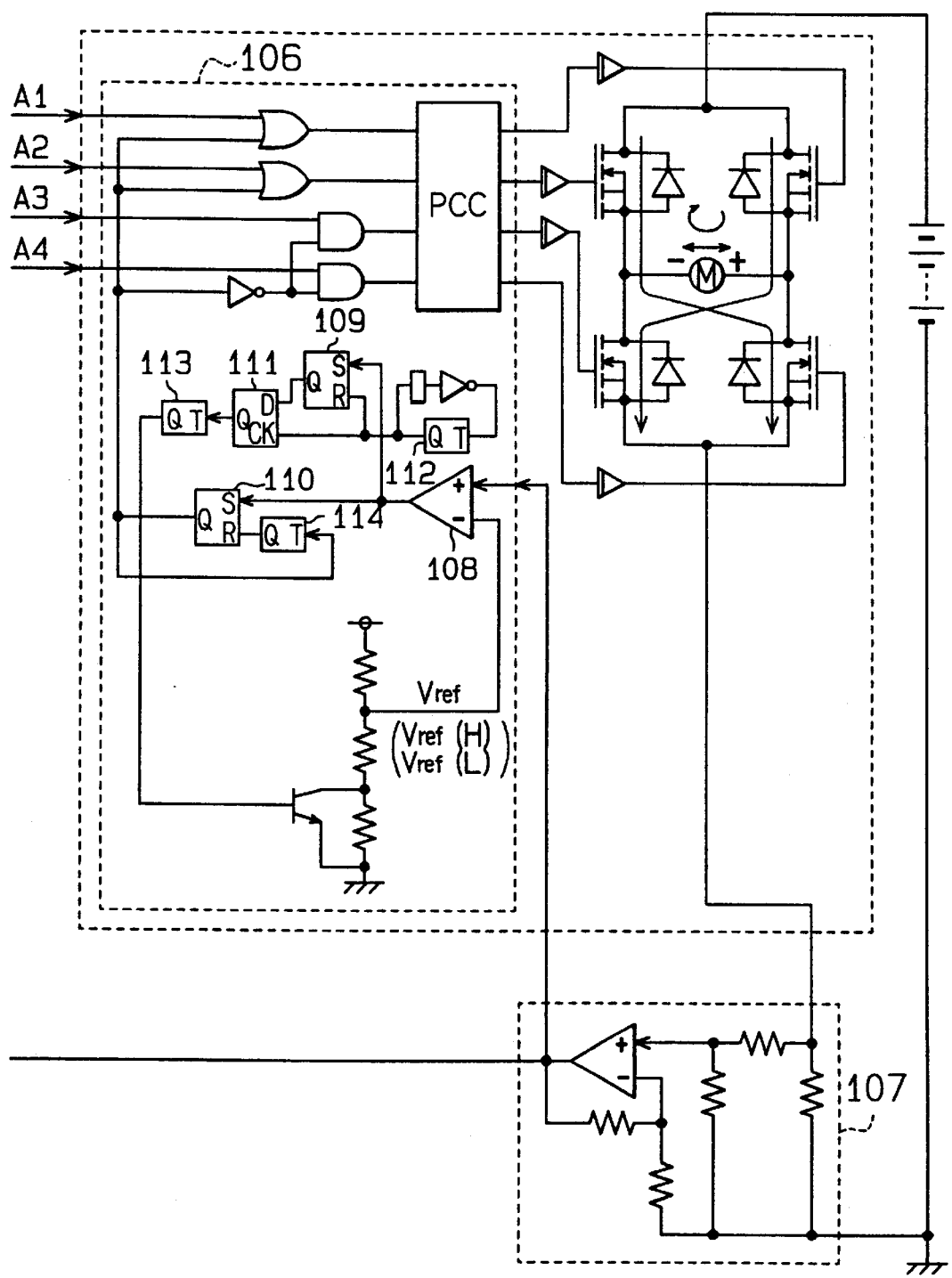
FIG. 24 is a detailed circuit diagram showing the drive circuit shown in FIG. 23.
Figure 25:
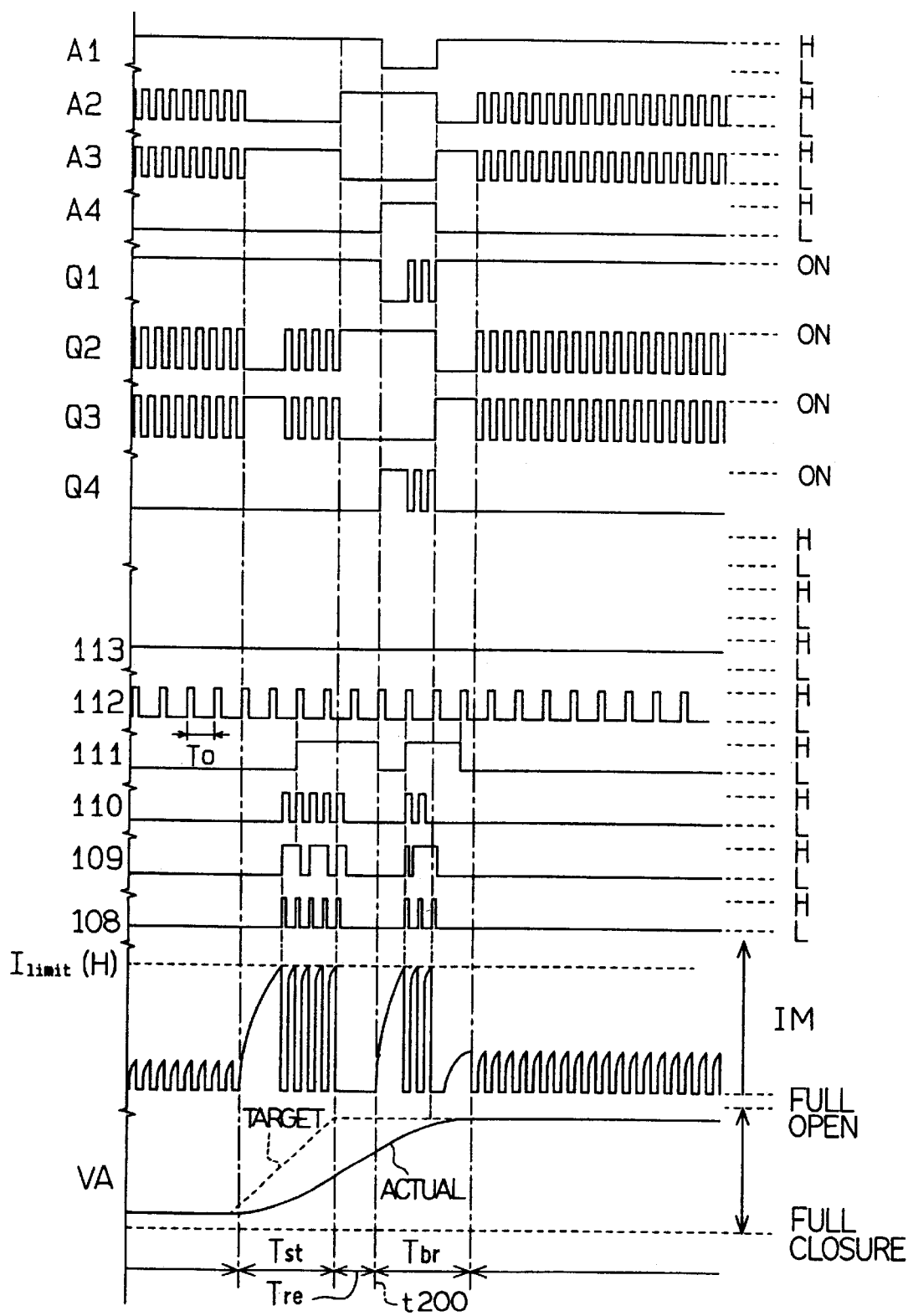
FIG. 25 is a timing diagram showing an operation of the conventional apparatus under a normal condition.

FIG. 21 shows an operation from the current supply to interruption under the lock condition.

When the lock occurs immediately from the drive start current supply, the current continues to exceed the limitation value Ilimit. When the timer 32 counts the predetermined time period t32, its terminal Q (output terminal Q32a) becomes the H-level. As a result, the L-level is applied to the AND gates 96, 97, 98 and 99 through the NOT gate 95 to turn off the MOSFETs 13–16. This condition is maintained.

As an application, this embodiment can be applied to a system which has a circuit (reset pulse generation circuit 60 shown in FIG. 9) within the drive circuit for detecting the change in the current supply phases from the drive command signals A1–A4 and generating the reset pulse as described in the second embodiment in place of generating the reset pulse by the processing (software) of the microcomputer 8.

Further, the current supply may be interrupted when the large current continues to flow for the predetermined time period in a system which limits the current as in the first to fourth embodiments, although the current supply is interrupted in the present embodiment when the large current continues to flow for the predetermined time period in the system which does not limit the current. That is, the current supply may be interrupted in place of being limited to the low current Ilimit(L).

The present invention should not be limited to the disclosed embodiments and modifications, but may be embodied in many other ways without departing from the spirit of the invention.

What is claimed is:

1. A motor drive apparatus comprising:

a motor having an output shaft to which a driven object is coupled to be position-controlled;

a drive circuit which supplies electric current to the motor;

position detection means which detects a position of the driven object;

control means which receives a position detection signal from the position detection means and produces a drive command signal to the drive circuit to control the position of the driven object to a target position, the drive command signal being for starting to drive the motor at rest and supplying the current in a reverse direction for braking;

current detection means for detecting the current supplied to the motor;

current supply restriction means for restricting the current supply to the motor when the current value detected by the current detection means is in a large current supply condition and the condition continues for more than a predetermined time period; and reset means for resetting a time counting operation of the predetermined time period of the current supply restriction means in response to a detection of switching of current supply directions caused between motor drive start and braking.

2. A motor drive apparatus as in claim 1, wherein:

the current supply restriction means restricts the current supply to the motor from the predetermined large current to a lower current in response to the detection of the large current supply condition continuing for more than the predetermined time period.

3. A motor drive apparatus as in claim 1, wherein the current supply restriction means includes:

first current limitation means for limiting the current value detected by the current detection means not to exceed a first current limitation value; and second current limitation means for limiting the current value detected by the current detection means not to exceed a second current limitation value lower than the first current limitation value in response to a detection of a current limitation of the first current limitation means continuing for more than the predetermined time period.

4. A motor drive apparatus as in claim 3, wherein:

the first current limitation means interrupts the current supply for a fixed time period when the current supplied to the motor reaches the limitation value and limits the current value detected by the current detection means not to exceed the first current limitation value; and the second current limitation means monitors a current supply interruption executed at every predetermined time interval and limits the current value detected by the current detection means not to exceed the second current limitation value when the monitored continuation of the current supply interruption reaches the predetermined time period.

5. A motor drive apparatus as in claim 1, wherein:

the motor is connected to an H-bridge circuit using four switching devices; and the reset means includes latch means for temporarily storing a drive command signal corresponding to the switching device which is not controlled to circulate the current among drive command signals corresponding to the four switching devices.

6. A motor control apparatus as in claim 1, further comprising:

means for superimposing a signal for resetting the counting operation of the predetermined time period on the drive command signal from the control means to the drive circuit at a side of the control means, and to extract the signal for resetting at a side of the drive circuit.

7. A motor control method for controlling a motor which drives a control object comprising:

supplying an electric current to the motor to control a position of the control object, a direction of the current being reversed between a motor drive starting and a motor braking;

limiting the current to a first level in each period of the motor drive starting and the motor braking;

counting a time period in which the current is limited to the first level;

limiting the current to a second level lower than the first level when the counted time period reaches a predetermined period;

detecting a switching of direction of supply of the current; and resetting. an operation of counting the time period when the switching of direction is detected.

* * * * *